(12) United States Patent
Kelly et al.

(10) Patent No.: US 11,366,036 B2
(45) Date of Patent: Jun. 21, 2022

(54) POLYMER COMPOSITE VACUUM COMPONENTS

(71) Applicant: MKS Instruments, Inc., Andover, MA (US)

(72) Inventors: Brandon J. Kelly, Longmont, CO (US); Clinton L. Percy, Windsor, CO (US); Scott C. Heinbuch, Fort Collins, CO (US); Gerardo A. Brucker, Longmont, CO (US); Timothy C. Swinney, Fort Collins, CO (US); Timothy R. Piwonka-Corle, Longmont, CO (US)

(73) Assignee: MKS Instruments, Inc., Andover, MA (US)

( * ) Notice: Subject to any disclaimer, the term of this patent is extended or adjusted under 35 U.S.C. 154(b) by 55 days.

(21) Appl. No.: 17/119,804

(22) Filed: Dec. 11, 2020

(65) Prior Publication Data

US 2021/0096035 A1    Apr. 1, 2021

Related U.S. Application Data

(60) Division of application No. 16/415,313, filed on May 17, 2019, now Pat. No. 10,876,917, which is a
(Continued)

(51) Int. Cl.
*G01L 21/34* (2006.01)
*G01L 21/30* (2006.01)
(Continued)

(52) U.S. Cl.
CPC ........ *G01L 21/34* (2013.01); *B29C 45/14065* (2013.01); *G01L 19/0084* (2013.01);
(Continued)

(58) Field of Classification Search
CPC .......... B29C 45/14065; G01L 19/0084; B29K 2069/00
See application file for complete search history.

(56) References Cited

U.S. PATENT DOCUMENTS 2,605,445 A    7/1952  Reich
3,769,537 A    10/1973 Hofmann
(Continued)

FOREIGN PATENT DOCUMENTS

CN    101046423 A    10/2007
CN    101174082 A    5/2008
(Continued)

OTHER PUBLICATIONS

PCT/US2016/013219 Invitation to Pay Additional Fees and, Where Applicable, Protest Fee, dated Sep. 14, 2016, entitled "Polymer Composite Vacuum Components."
(Continued)

*Primary Examiner* — Dominic E Hawkins
(74) *Attorney, Agent, or Firm* — Hamilton, Brook, Smith & Reynolds, P.C.

(57) ABSTRACT

A gauge having a housing formed of a polymer material and one or more electrical feedthrough pins disposed in the housing. The electrical feedthrough pins can be oriented substantially perpendicular to each other and have complex shapes.

22 Claims, 17 Drawing Sheets

Related U.S. Application Data continuation of application No. 14/994,969, filed on Jan. 13, 2016, now Pat. No. 10,359,332.

(60) Provisional application No. 62/191,140, filed on Jul. 10, 2015, provisional application No. 62/103,968, filed on Jan. 15, 2015.

(51) Int. Cl.

| | | |
|---|---|---|
| *G01L 19/00* | (2006.01) | |
| *B29C 45/14* | (2006.01) | |
| *B29K 23/00* | (2006.01) | |
| *B29K 69/00* | (2006.01) | |
| *B29K 71/00* | (2006.01) | |
| *B29L 31/00* | (2006.01) | |

(52) U.S. Cl.
CPC .......... *G01L 21/30* (2013.01); *B29K 2023/12* (2013.01); *B29K 2069/00* (2013.01); *B29K 2071/00* (2013.01); *B29L 2031/752* (2013.01)

(56) References Cited

U.S. PATENT DOCUMENTS

| | | | |
|---|---|---|---|
| 4,013,913 A | 3/1977 | Driscoll et al. | |
| 4,295,117 A | 10/1981 | Lake et al. | |
| 4,325,005 A | 4/1982 | Ab | |
| 5,157,333 A | 10/1992 | Peacock et al. | |
| 5,278,510 A | 1/1994 | Baptist et al. | |
| 5,317,270 A | 5/1994 | Lethbridge | |
| 5,422,573 A | 6/1995 | Bills et al. | |
| 5,502,354 A | 3/1996 | Correa et al. | |
| 5,568,053 A | 10/1996 | Drubetsky et al. | |
| 6,168,653 B1 | 1/2001 | Myers | |
| 6,515,482 B2 | 2/2003 | Kawasaki | |
| 6,525,292 B1 | 2/2003 | Girold | |
| 6,593,686 B1 | 7/2003 | Yui | |
| 6,734,433 B1 | 5/2004 | Mcunier et al. | |
| 6,993,973 B2 | 2/2006 | Lischer et al. | |
| 7,129,708 B1 | 10/2006 | Liu et al. | |
| 7,352,187 B2 | 4/2008 | Knapp et al. | |
| 7,768,267 B2 | 8/2010 | Knott et al. | |
| 7,847,559 B2 | 12/2010 | Knott | |
| 7,906,971 B2 | 3/2011 | Boardwine et al. | |
| 8,120,366 B2 | 2/2012 | Kawasaki | |
| 8,456,167 B2 | 6/2013 | Key | |
| 8,586,918 B2 | 11/2013 | Brucker et al. | |
| 8,648,604 B2 | 2/2014 | Brucker | |
| 8,686,733 B2 | 4/2014 | Brucker | |
| 8,947,098 B2 | 2/2015 | Carmichael et al. | |
| 9,316,555 B2 * | 4/2016 | Enomoto ............... | G01L 21/34 |
| 10,359,332 B2 | 7/2019 | Kelly et al. | |
| 10,876,917 B2 | 12/2020 | Kelly et al. | |
| 2001/0052516 A1 | 12/2001 | Chan | |
| 2002/0157759 A1 | 10/2002 | Raghavan et al. | |
| 2003/0057953 A1 | 3/2003 | Rutherford et al. | |
| 2004/0128016 A1 | 7/2004 | Stewart | |
| 2007/0179554 A1 | 8/2007 | Iyer et al. | |
| 2007/0295109 A1 | 12/2007 | Tokumoto et al. | |
| 2008/0100301 A1 * | 5/2008 | Knott ....................... | H01J 41/04 324/460 |
| 2009/0014667 A1 | 1/2009 | Hahto et al. | |
| 2009/0096460 A1 | 4/2009 | Watanabe et al. | |
| 2009/0146665 A1 | 6/2009 | Knott | |
| 2010/0045300 A1 | 2/2010 | Brothier et al. | |
| 2010/0090703 A1 | 4/2010 | Boardwine et al. | |
| 2010/0122978 A1 | 5/2010 | Oh et al. | |
| 2010/0259273 A1 | 10/2010 | Kawasaki et al. | |
| 2010/0301869 A1 | 12/2010 | Kawasaki | |
| 2011/0101988 A1 | 5/2011 | Key | |
| 2011/0103805 A1 | 5/2011 | Bogart et al. | |
| 2012/0103837 A1 | 5/2012 | Wall et al. | |
| 2013/0048851 A1 | 2/2013 | Kumano et al. | |
| 2014/0152320 A1 | 6/2014 | Brucker | |
| 2014/0176150 A1 | 6/2014 | Andreaus | |
| 2014/0368210 A1 | 12/2014 | Enomoto et al. | |
| 2015/0091579 A1 | 4/2015 | Brucker et al. | |
| 2015/0091580 A1 | 4/2015 | Brucker et al. | |
| 2016/0025587 A1 | 1/2016 | Andreaus et al. | |
| 2016/0131548 A1 | 5/2016 | Brucker et al. | |
| 2016/0209288 A1 | 7/2016 | Kelly et al. | |
| 2019/0271607 A1 | 9/2019 | Kelly et al. | |

FOREIGN PATENT DOCUMENTS

| | | |
|---|---|---|
| CN | 101470039 A | 7/2009 |
| CN | 201837495 A | 5/2011 |
| CN | 202033149 U | 11/2011 |
| GB | 2 256 310 | 12/1992 |
| JP | S5233901 Y2 | 8/1977 |
| JP | 2011133386 A | 7/2011 |
| KR | 20010000401 A | 1/2001 |
| WO | WO 00/67918 | 11/2000 |
| WO | 2009063233 A2 | 5/2009 |
| WO | WO 2009/085165 A2 | 7/2009 |
| WO | WO 2009/105506 A1 | 8/2009 |
| WO | WO 2010/033427 A1 | 3/2010 |
| WO | WO 2010/129690 A1 | 11/2010 |
| WO | WO 2013/119851 A1 | 8/2013 |
| WO | WO 2015/048664 A1 | 4/2015 |
| WO | WO 2016/115232 A2 | 7/2016 |

OTHER PUBLICATIONS

Notification of Transmittal of the International Search Report and the Written Opinion of the International Searching Authority, or the Declaration, for Int'l Appl. No. PCT/US2016/013219, titled "Polymer Composite Vacuum Components," dated Nov. 7, 2016.

International Preliminary Report on Patentability for Int'l Appl. No. PCT/US2016/013219, titled "Polymer Composite Vacuum Components," dated Jul. 18, 2017.

AMETEK Interconnect Technologies, Rugged HPHT Bulkhead Series: CPX622, Date unknown.

Clare, A.T. et al., "Linear Ion Trap Fabricated Using Rapid Manufacturing Technology," J Am Soc Mass Spectrom. 21(2):317-22 (2010).

Grant, R., et al., "Active vacuum gauges: application to inverted magnetrons," Vacuum, 43(5-7):677-679 (1992).

Murari, A. et al., "Comparison of PEEK and VESPEL® SPI Characteristics as Vacuum Seals for Fusion Applications," 2002 Elsevier Science Ltd. 65 137-145 (2002).

* cited by examiner

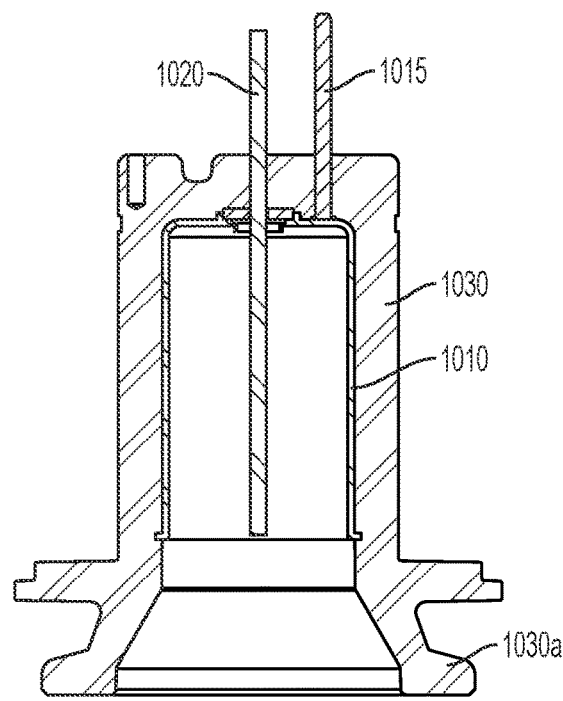
FIG. 16A
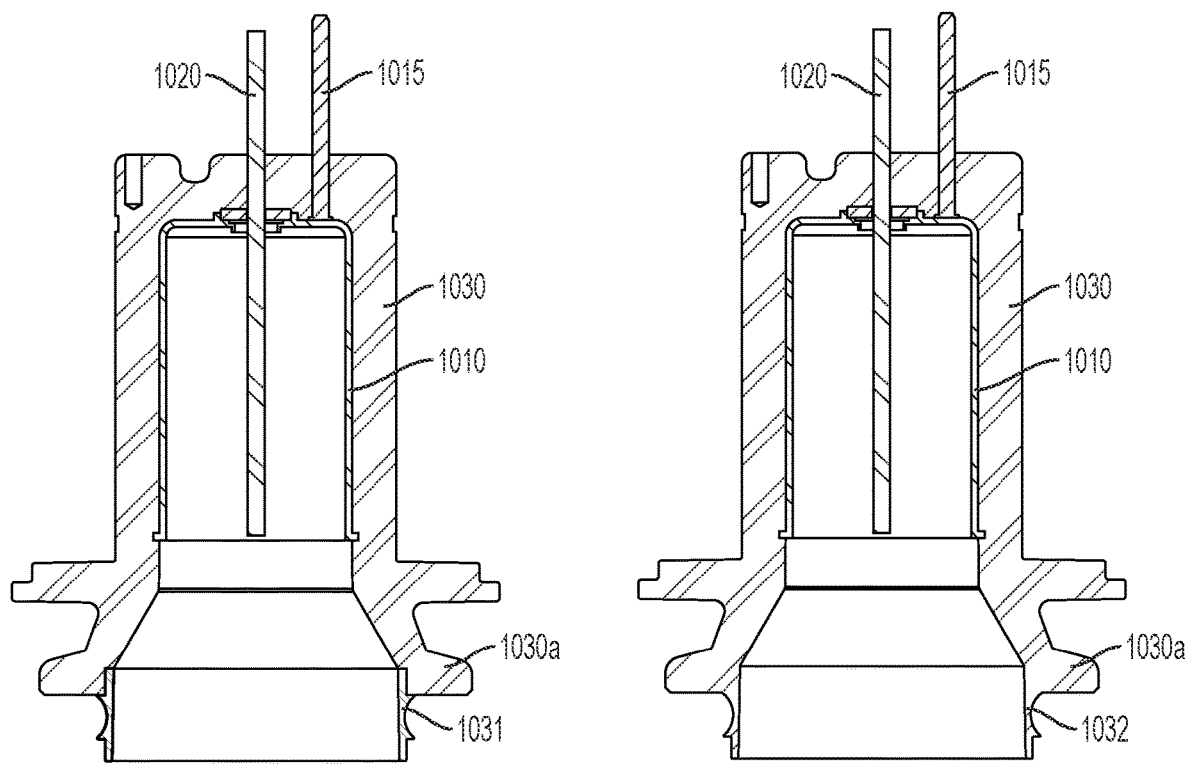
FIG. 16B
FIG. 16C

POLYMER COMPOSITE VACUUM COMPONENTS

RELATED APPLICATIONS

This application is a divisional of U.S. application Ser. No. 16/415,313, filed May 17, 2019, which is a continuation of U.S. application Ser. No. 14/994,969, filed Jan. 13, 2016, now U.S. Pat. No. 10,359,332, issued Jul. 23, 2019, which claims the benefit of U.S. Provisional Application No. 62/103,968, filed on Jan. 15, 2015, and U.S. Provisional Application No. 62/191,140 filed on Jul. 10, 2015. The entire teachings of the above applications are incorporated herein by reference.

BACKGROUND OF THE INVENTION

Accurate and repeatable pressure measurements are an important requirement for the operation of both industrial and research vacuum systems. Pressure gauge sensors used to measure vacuum levels in such applications operate based on a wide range of technological principles and share common building blocks in their design, including: (1) a leak tight envelope that houses the pressure sensing elements, (2) electrical feedthroughs that bridge the envelope walls and exchange power, bias voltages and measurement signals with the electronics and (3) a flange that allows leak tight connection of the gauge sensor to the vacuum system port. Historically, pressure gauge sensors have relied on well-established design and manufacturing methodologies that use metallic materials and ceramic insulators. Legacy gauge construction materials are the result of the natural evolution of vacuum technology research and satisfy the mechanical, electrical and high vacuum compatibility properties that are expected from vacuum pressure sensors.

Ionization vacuum gauges are well known and include both hot and cold cathode gauges. A cold cathode ionization gauge has a pair of electrodes (i.e., an anode pin and a cathode cage) in an evacuated envelope which is connected to the vacuum to be measured. In the cold cathode gauge, a high DC voltage potential difference is applied between the anode electrode and the cathode electrode to cause a discharge current to flow therebetween. A magnetic field is applied along the axis of the electrodes in order to help maintain the discharge current at an equilibrium value which is a repeatable function of pressure. Cold cathode ionization gauges are used to measure pressures extending from medium to high vacuum levels (e.g., in the range of 1E-10 to 1E-02 Torr).

Accordingly, an ionization vacuum gauge provides an indirect measurement of vacuum system total pressure by first ionizing gas molecules and atoms inside its vacuum gauge envelope and then measuring the resulting ion current. The measured ion current is directly related to the gas density and gas total pressure inside the gauge envelope, i.e., as the pressure inside the vacuum system decreases, the measured ion current decreases. Gas specific calibration curves provide the ability to calculate total pressures based on ion current measurements.

SUMMARY OF THE INVENTION

Components in high performance vacuum systems have historically been fabricated from stainless steel, which provides low outgassing and can be machined into parts that can be subsequently joined together into leak tight structures that house the pressure sensing elements and provide electrical access to the internal components. One disadvantage of stainless steel components is that unique geometries are difficult to manufacture due to the limits by which parts can be machined. Typically, the housing is machined to the appropriate geometry by removing metal from a starting product. Feedthrough connectors are created through a combination of ceramic insulators and conductive metallic pins that are assembled together through a series of welding and brazing operations. It is challenging to manufacture a housing that has nonlinear electrical feedthrough pins with traditional machining processes for metal components. Additionally, stainless steel can be relatively expensive, thereby increasing the cost of manufacturing for all high vacuum compatible pressure measurement gauges. Another disadvantage of stainless steel components is the requirement to produce leak tight seals compatible with standard vacuum flanges, which are expensive and very time consuming to implement. Plastic materials provide an opportunity to develop alternative sealing techniques, compatible with traditional sealing flanges, that are cheaper, have lower manufacturer cost, and provide faster installation. Plastics do not only offer the promise of cheaper pressure gauging products for the vacuum industry, but also an opportunity to significantly improve the workflow for vacuum practitioners. When a process chamber is opened to the atmosphere for an operational reason, the sensor can quickly and inexpensively be switched with a new one, thereby eliminating the need to take manufacturing offline due to a faulty gauge that is past its useful lifetime. Additionally, plastic materials offer an opportunity to provide designs that would be inconceivable with metal and ceramic components.

Described herein are methods of forming components of a gauge, for example an ionization gauge, from polymers. The use of polymers can decrease manufacturing costs by permitting the use of molds to rapidly form components of the required geometry. Additionally, a molded housing can have electrical feedthrough pins passing directly through the insulating housing at unique geometries and angles that are difficult to manufacture when the housing is formed of stainless steel or another metal. Additionally, feedthrough pins can be designed that have longer path lengths through the housing, which can improve the quality of the vacuum by decreasing the flux of gas leaking into the vacuum space.

Described herein is a gauge, such as an ionization gauge, having a housing formed of a polymer material and an electrical feedthrough pin disposed through the housing.

Also described herein is a method of making a housing for use in a gauge, such as an ionization gauge. The method can include positioning an electrical feedthrough pin in a mold, flowing molten polymer into the mold, and allowing the molten polymer to solidify to form a housing. The method can further include coating an interior side surface of the housing with a vacuum sealing material. The mold can form a flange to couple the gauge to a process chamber.

A second electrical feedthrough pin can be disposed through the housing. One electrical feedthrough pin can be disposed through a base of the housing and the second electrical feedthrough pin can be disposed through a side of the housing. The electrical feedthrough pins can be oriented substantially perpendicular to each other. The electrical feedthrough pin can have a nonlinear portion, which can be disposed through the polymer material of the housing. The electrical feedthrough pin can be coupled to an anode or a cathode.

The electrical feedthrough pin can have a threaded portion disposed within the polymer of the housing. The electrical feedthrough pin can be further coupled to the housing with an O-ring. The electrical feedthrough pin can have an extended disc portion disposed within the polymer of the housing. The electrical feedthrough pin can be formed by molding a conductive polymer into the sensor housing between two electrical feethrough pins, thereby coupling two conductors with a conductive matrix embedded within the housing.

The electrical feedthrough pin can be further coupled to the housing with a component having a knife edge. The component having a knife edge can be formed of a shape memory polymer, preferably a thermally-activated shape memory polymer.

The gauge can further include a sensor disposed within the housing. The sensor can be, for example, the inverted magnetron electrode structure of a cold cathode ionization gauge. An interior side surface of the housing can be coated with a vacuum sealing material. A flange can couple the gauge to a process chamber. The flange can be integrally molded to the housing in a monolithic envelope-flange design.

Described herein is a component, such as a closure, of a high vacuum housing. The component can include a molded polymer with a vacuum-sealing coating on a vacuum side. The component can be a vacuum blank. The vacuum blank can have a knife edge or other raised structure. The molded polymer can be a shape memory polymer, preferably a thermally-activated shape memory polymer. The component can include a knife edge or other raised structure.

Also described herein is a method of sealing a high vacuum housing. The method includes inserting a molded polymer having a vacuum-sealing coating on the vacuum side into an orifice, removing the molded polymer from the orifice, and heating the molded polymer to restore the molded polymer to a pre-deformed shape. The molded polymer can be a shape memory polymer that deforms upon insertion into the orifice.

Also described herein is a gauge, for example, a cold cathode ionization gauge. The gauge can include a cylindrical cathode cage having a base, which can have an opening, a cathode pin electrically coupled to the cathode, an anode disposed through the opening of the base. A polymer housing surrounding the cylindrical cathode cage, and an insulator at the base of the cylindrical cathode cage that protects the polymer housing at an interface between the cylindrical cathode cage and the polymer housing. The gauge can include a sputter shield disposed within the cylindrical cathode cage that is coaxial with the anode. The gauge can include a starter that is electrically coupled to the anode and disposed within the cylindrical cathode cage. A bottom face of the base of the cylindrical cathode cage can have a lip surrounding the insulator. An upper portion of the cold cathode cage can have a lip that extends radially outward from the cold cathode cage into the polymer housing. The gauge can include a ferromagnetic screen coupled to an upper portion of the cold cathode cage. The opening of the base of the cylindrical cathode cage can have a step edge to shadow the insulator. The polymer housing can include a flange to couple the ionization gauge to a chamber. A cylindrical magnet can surround at least a portion of the polymer housing. An O-ring can be disposed around the anode, within the polymer housing, and below the base of the cylindrical cathode cage. The gauge can include a printed circuit board, wherein the anode is disposed through the printed circuit board and the polymer housing is mechanically coupled to the printed circuit board. The polymer housing can be formed of polyether ether ketone (PEEK), polypropylene, or polycarbonate. The polymer housing is formed of a polymer having an outgassing rate less than $5 \times 10^{-6}$ Torr L s$^{-1}$ cm$^{-2}$. The polymer housing can be formed of a polymer that is not hygroscopic. The gauge can include a cylindrical insulator that surrounds a portion of the anode disposed through the printed circuit board. The gauge can include an enclosure, which can be formed of polymer, that at least partially surrounds the polymer housing and printed circuit board. The gauge can include a connector coupled to the enclosure.

Also described herein is an assembly for a gauge, which can include a cylindrical cathode cage having a base, which can have an opening, a cathode pin electrically coupled to the cathode, an anode disposed through the opening of the base, and an insulator at the base of the cylindrical cathode cage that is configured to protect a polymer housing at an interface between the cylindrical cathode cage and the polymer housing. The assembly is configured for insertion into a mold, typically for use in making a gauge. The gauge assembly can include a sputter shield disposed within the cylindrical cathode cage that is coaxial with the anode. The gauge assembly can include a starter that is electrically coupled to the anode and disposed within the cylindrical cathode cage. A bottom face of the base of the cylindrical cathode cage can have a lip surrounding the insulator. An upper portion of the cold cathode cage can have a lip that extends radially outward from the cold cathode cage into the polymer housing. The gauge assembly can include a ferromagnetic screen coupled to an upper portion of the cold cathode cage. The opening of the base of the cylindrical cathode cage can have a step edge to shadow the insulator.

Also described herein is a method of making a gauge. The method can include positioning within a mold a gauge assembly, such as described in the preceding paragraph, flowing molten polymer into the mold, and allowing the molten polymer to solidify to form a housing around the cylindrical cathode cage, cathode pin, anode, and insulator. The method can include positioning a cylindrical magnet surrounding at least a portion of the polymer housing. The method can include positioning an O-ring around the anode, within the polymer housing, and below the base of the cylindrical cathode cage. The method can include mechanically coupling a printed circuit board to the polymer housing, wherein the anode is disposed through the printed circuit board. The polymer housing can be formed of polyether ether ketone (PEEK), polypropylene, or polycarbonate. The polymer housing can be formed of a polymer having an outgassing rate less than $5 \times 10^{-6}$ Torr L s$^{-1}$ cm$^{-2}$. The polymer housing can be formed of a polymer that is not hygroscopic. The method can include positioning a cylindrical insulator that surrounds a portion of the anode disposed through the printed circuit board. The method positioning an enclosure that at least partially surrounds the polymer housing and printed circuit board. The enclosure can be formed of a polymer. The method can include coupling a connector to the enclosure.

Also described herein is a closure for a vacuum housing formed substantially of polymer. The closure can be metal-coated. The closure can also have a knife edge, such as in a CONFLAT flange.

The components and methods described herein can provide a number of advantages and are applicable to a variety of components in vacuum instrumentation, including Convection Enhanced Pirani (CEP) gauges, Micro-Ion sensors, ion trap sensors, metal Bayard-Alpert sensors (such as the STABIL-ION sensor from MKS Instruments, Inc., Andover, Mass., USA), glass Bayard-Alpert sensors, and thermocouple sensors. Additionally, the injection molding process is very reproducible, and a gauge produced by injection molding could be shipped directly from an injection molding facility to an end user.

Distinct components of a vacuum gauge can be consolidated into one molded or machined polymer structure, thereby reducing the number of assembly and joining steps required to construct the sensor. In other words, the components and methods described herein provide for simpler designs that can be more cost-effective to manufacture. One particular example is a gauge, such as an ionization gauge having a housing with a flange and metal feedthrough pins, that is created in one injection molding step. As an alternative, the feedthrough pins can be simply press-fit after an injection molding process.

Unique geometries can be manufactured, such as nonlinear electrical feedthrough pins, which are difficult to construct using traditional machining processes based on metallic materials. In some embodiments, cost-prohibitive materials can be coated in thin layers for tailored applications, such as harsh environments (e.g., implant or chemical etch). New sealing components with low outgassing, due to the compliant nature of the polymers, can be constructed. Vacuum feedthroughs can be constructed by press-fitting electrical conductors, gas flow pipes, or other mechanical structures through polymer sealing components. Alternatively, polymer can be injection molded around those components, thereby eliminating the need to press-fit them. The vacuum feedthroughs can be constructed so that a separate glass, metal, or ceramic sealing component is unnecessary. In other words, the components can be constructed without having a separate vacuum-sealing structure other than the interface between the polymer and the vacuum feedthrough pin. Vacuum feedthroughs can also be constructed by including inserts, whether metal or another material, in the polymer molding process to create a composite structure comprised of both electrical and/or mechanical feedthrough and the supporting structure itself. Another advantage of polymer molding is that the conductive structures, such as the cathode and the electrical feedthrough, can be pre-joined by welding or other means when they are easier to manipulate, and then the envelope and flanges can be molded around them.

More recently there has been increased interest from the vacuum industry to produce lighter, smaller and lower cost pressure gauging products. Vacuum products present their own challenges for compatibility with operation at, or exposure to, high vacuum. Alternative construction materials, such as polymeric plastics, are identified herein to produce a new generation of pressure measurement gauges that are compatible with operation at, or exposure to, high vacuum levels and can provide the required pressure measurement performance at a reduced cost and in a lighter, smaller and even disposable package.

The present work describes the selection of the proper materials and manufacturing methodologies that will allow to replace all building blocks for gauge manufacturing with alternative designs that include plastics (low cost material) as the main manufacturing components. The goal is to produce a new generation of plastic gauges which measure pressure by a variety of technologies, including (but not restricted to): ionization, thermal conductivity, friction and diaphragm deflection. With proper material selection, a new generation of plastic vacuum gauges, compatible with operation in high vacuum systems, will become standard in the vacuum industry.

Plastic materials and plastic manufacturing techniques can be used to design and manufacture the typical building blocks of all high vacuum compatible pressure gauges, including: leak tight housing, electrical feedthroughs and mounting flanges. The cold cathode ionization gauge is used as an example of a high vacuum compatible gauge that can be designed using plastic materials and it is clear that similar concepts can be used to design other vacuum compatible gauges that share common building blocks. Examples include: hot cathode gauges, pirani gauges and even diaphragm gauges. The development of a plastic vacuum gauge requires many different technical considerations including: proper material (or materials) selection, cost effective and high vacuum compatible assembly/sealing techniques, protection of exposed plastic surfaces from hazardous environmental conditions including reactive process gases and internally generated species (such as ions and metastables in internal plasmas). The design and manufacture of plastic gauges is one path to the development of low cost gauges. Plastics do not only offer low cost material alternatives but also the ability to reduce the number of assembly steps leading to reduced assembly errors and cost.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 16A-C are illustrations of polymer molded flanges. FIG. 16A is a standard flange. FIG. 16B is an insert molded centering ring. FIG. 16C is a one piece flange and centering ring.

FIG. 17A is an illustration of an assembly for a gauge prior to injection molding, and FIG. 17B is an illustration of the gauge after injection molding.

DETAILED DESCRIPTION OF THE INVENTION

Figure 1A:
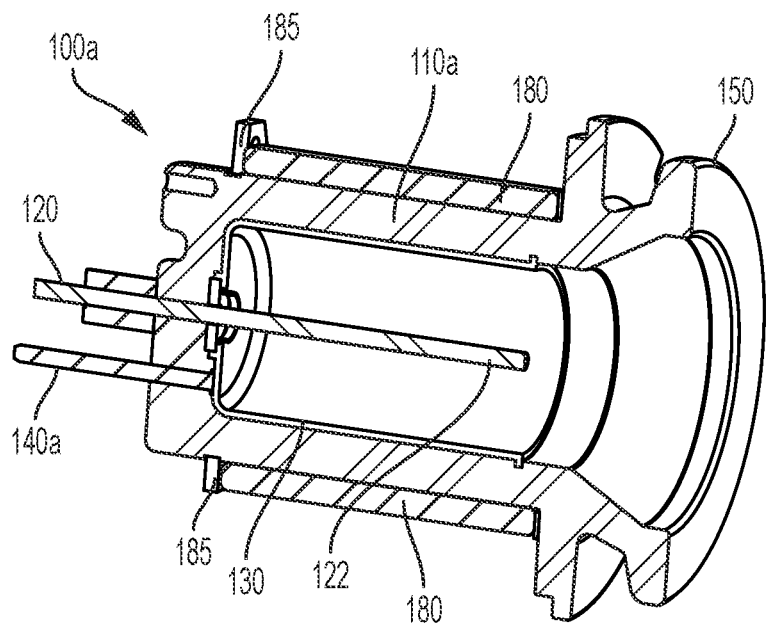
FIG. 1A is an illustration of a housing for an ionization gauge. The housing has two electrical feedthrough pins that are axially disposed through the base of the housing.

A description of example embodiments of the invention follows.

The cold cathode ionization vacuum gauge described herein relies on the inverted magnetron principle. The gauge is of cylindrical symmetry. A large voltage potential difference (i.e., radial electric field) between the anode pin, located on the axis of the gauge, and the cylindrical cathode, inside the vacuum envelope, provides energy to the electrons for the ionization events to occur. A crossed axial magnetic field provides the longer electron trajectory path length required to sustain a discharge inside the envelope. The discharge current is the measured quantity and is proportional to the total pressure in the system.

The discharge is established through an avalanche ionization process that generally starts with a single electron being released into the ionization volume of the gauge. The process is responsible for releasing an electron can include a field emission event or a cosmic ray ionization process. The avalanche process relies on the long path length for the electron trajectories that leads to many ionization processes per electron. Each ionization process releases an ion as well as an additional electron that is added into the discharge. As the ions collide with the cathode internal walls, additional electrons are also released into the discharge, thereby contributing to the total charge. The electrical discharge current flowing from anode to cathode (consisting of ions and electrons) reaches a value that is proportional to the pressure in the system.

The cold cathode ionization vacuum gauge described herein is an inverted magnetron design. The inverted magnetron design, shown in FIG. 1A-F of this application, includes a magnet assembly 180 and 185. The concepts described herein are equally applicable to a Penning type design.

FIGS. 1A-1F illustrate embodiments of a housing for an ionization gauge 100. A housing 110a-d is formed of a polymeric material and an electrical feedthrough pin 120 is disposed through the housing 110a-f. The electrical feedthrough pin 120 can be coupled to an anode 122. Alternatively, the tip portion 122 of the electrical feedthrough pin 120 located within the interior of the housing 110a-f can function as an anode. A cylindrical cathode 130 is located within the interior of the housing 110a-f. In some embodiments, the cylindrical cathode 130 can be coated directly on the polymer on the vacuum side of the envelope. Common coating methods can be used to deposit the cathode. Depending on the final coating material, electroless plating followed by electroplating can be used as well as direct deposition methods, such as Physical Vapor Deposition (PVD), Chemical Vapor Deposition (CVD), or Plasma Enhanced Chemical Vapor Deposition (PECVD). When designing this coating, consideration should be given to the fact that the ions making up the plasma in a cold cathode sensor will sputter material from the cathode as they collide with it. Up to one gram of material can be sputtered off the cathode walls throughout the life of the gauge. The coating material should therefore have a thickness of >0.010 inches. The coating material should also ideally have a low sputtering rate and not contain any elements with ferromagnetic properties. A material such as titanium or aluminum can be used. In some embodiments, the cylindrical cathode 130 can be incorporated into the polymer housing 110a-f by press fitting, heating then press fitting, press fitting then heating, threading, threading and heating, heating and threading, or molding directly in place.

Figure 1B:
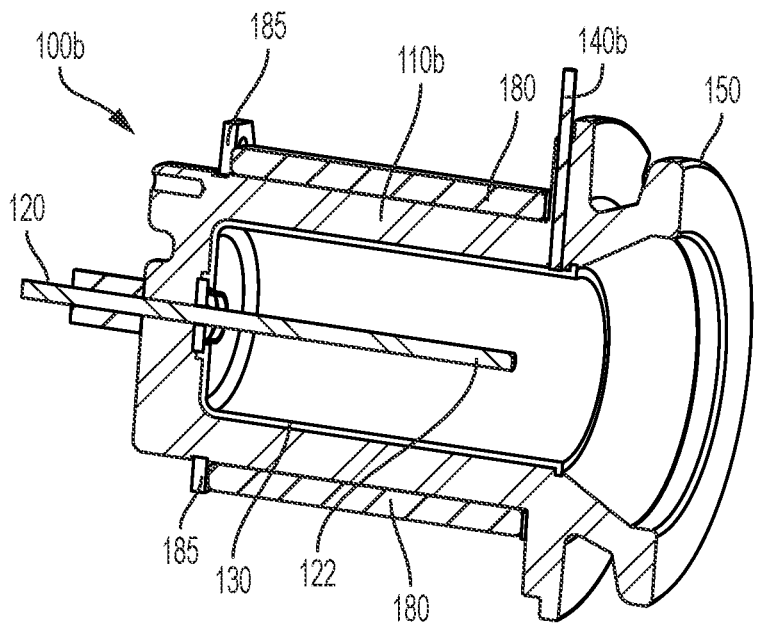
FIG. 1B is an illustration of a housing for an ionization gauge. The housing has one electrical feedthrough pin axially disposed through the base and a second electrical feedthrough pin disposed through the side of the housing.
Figure 1C:
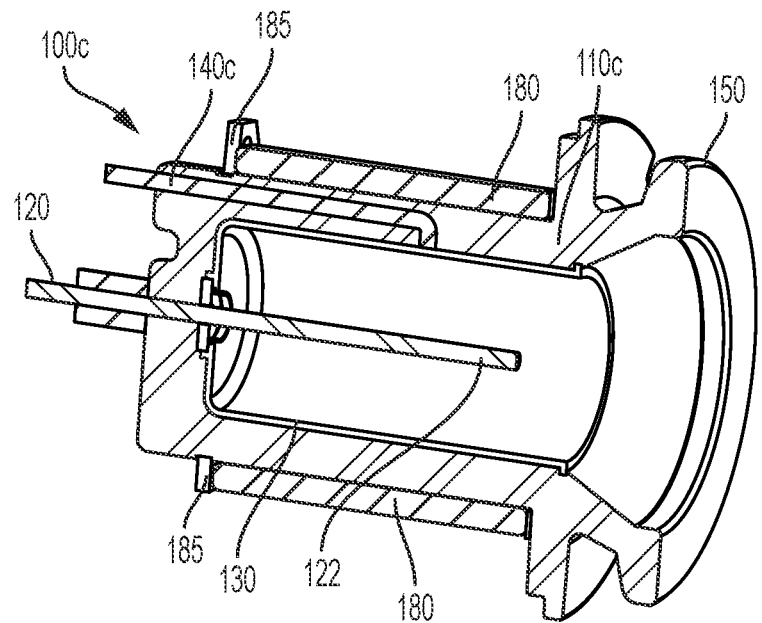
FIG. 1C is an illustration of a housing for an ionization gauge. The housing has one electrical feedthrough pin axially disposed through the base and a second electrical feedthrough pin disposed through the base of the housing. The second electrical feedthrough pin is nonlinear and makes a 90 degree turn.
Figure 1D:
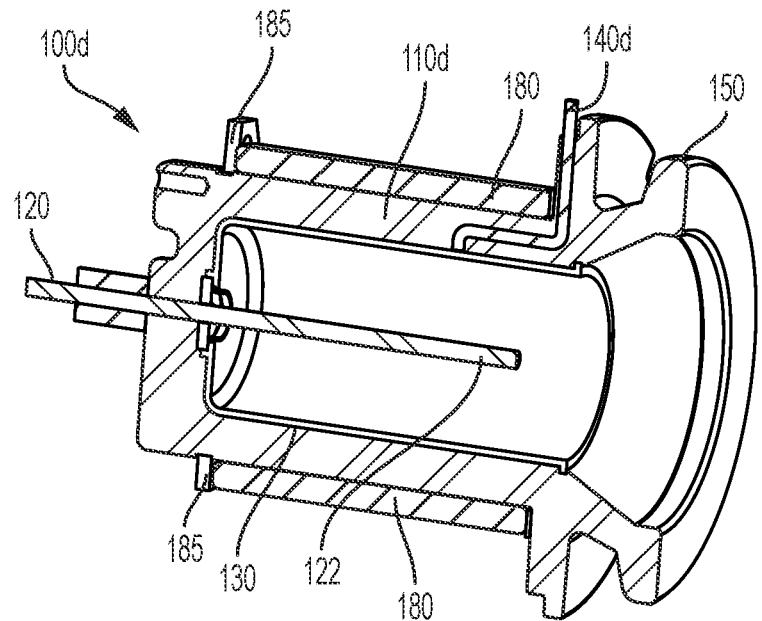
FIG. 1D is an illustration of a housing for an ionization gauge. The housing has one electrical feedthrough pin axially disposed through the base and a second electrical feedthrough pin disposed through the side of the housing. The second electrical feedthrough pin is nonlinear and curves as it passes through the housing.

In some embodiments, a second electrical feedthrough pin 140a-f can be disposed through the housing 110a-d. In the embodiment of FIG. 1A, the second electrical feedthrough pin 140a is collinear with the first electrical feedthrough pin 120 and electrically coupled to the cathode 130. In the embodiment of FIG. 1B, the second electrical feedthrough pin 140b is oriented perpendicular to the first electrical feedthrough pin 120. In the embodiment of FIG. 1C, the second electrical feedthrough pin 140c is nonlinear and makes a 90 degree turn so that it is disposed through the base of the housing. In the embodiment of FIG. 1D, the second electrical feedthrough pin 140d is nonlinear and makes a 90 degree turn so that it passes through the side of the housing 110d.

Figure 1E:
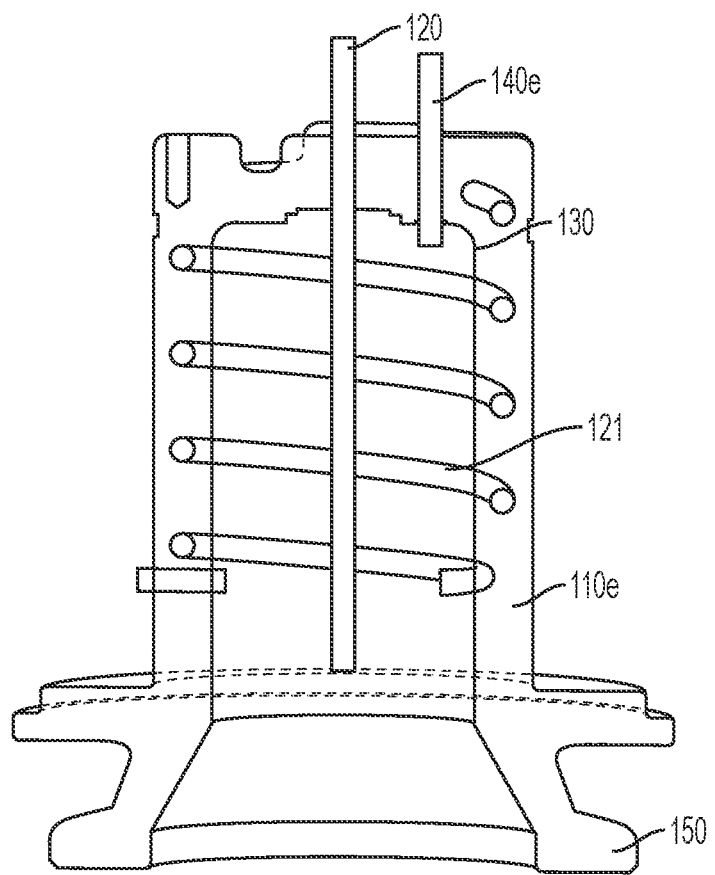
FIG. 1E is an illustration of a polymer housing having a helical electrical feedthrough pin.
Figure 1F:
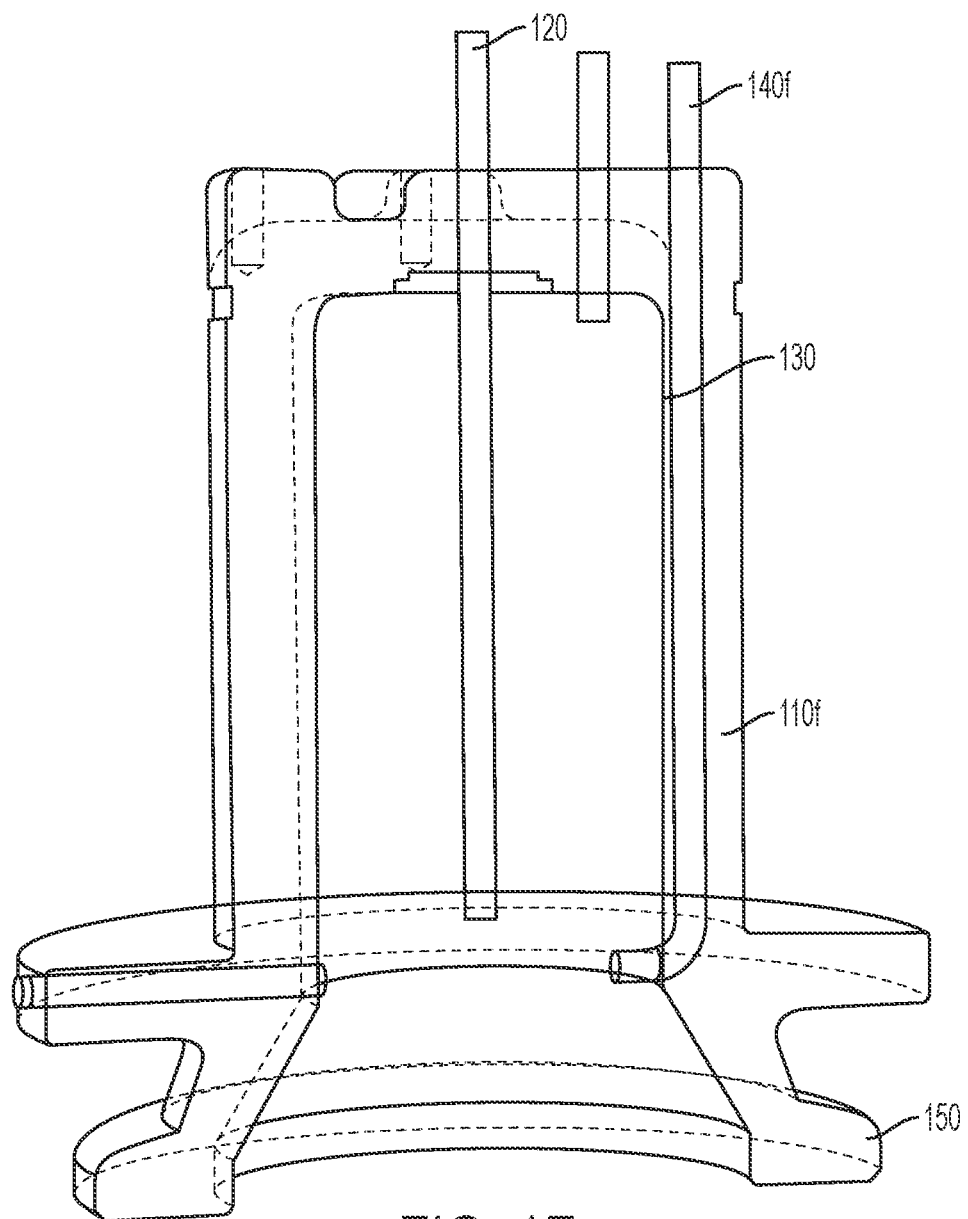
FIG. 1F is an illustration of a polymer housing having non-axial electrical pins.

Since the housing 110a-f is formed of a polymer material, the housing can be manufactured by a rapid throughput molding process. Additionally, the electrical feedthrough pins 120 and 140a-f can be oriented at unique positions prior to forming the housing. Then, the polymer housing can be formed around the electrical feedthrough pins 120 and 140a-f. Additionally, the electrical feedthrough pins can have complex, nonlinear geometries, as illustrated by electrical feedthrough pins 110c-d. Nonlinear geometries can include a wide variety of shapes. For example, nonlinear geometries can include changes in the direction of the longitudinal axis of an electrical feedthrough pin. Nonlinear geometries can also include changes in the plane in which the pin is oriented. For example, the electrical feedthrough pins 140a-f can be curved, and can have a curved portion disposed through the polymer material of the housing 110a-f. Notably, the molding process can permit the construction of a housing having electrical feedthrough pins 120 and 140a-f that access locations within the interior of the housing 110a-f that are inaccessible or difficult to access when the housing is formed of a metal, such as stainless steel. Another example of a nonlinear electrical feedthrough pin is illustrated in FIG. 1E, which has a helical electrical feedthrough pin 121. Another example of a nonlinear electrical feedthrough pin is illustrated in FIG. 1F, which has a curved feedthrough pin 140f. Increasing both the length and tortuosity, or amount of curvature, of feedthrough pins increases the path length that atoms or molecules of gas must traverse in order to pass from an air side of the gauge into a vacuum sealed area. Therefore, increasing the length and tortuosity of feedthrough pins decreases the flux of gas into the vacuum, thereby improving vacuum quality and increasing the precision and accuracy of gauge measurements. These types of designs have historically been difficult to manufacture using stainless steel components.

The housing 110a-f can also include a flange portion 150, which can be integrally molded with the housing 110a-f. The flange portion 150 can couple the ionization gauge to a process chamber. This flange portion can incorporate a gasket molded into the polymer, or a centering ring that holds the O-ring in a Klein Flange, or KWIK FLANGE type seal. In the case where the gasket is incorporated directly into the flange, a metallic knife edge on the chamber can deform the seal or the polymer flange forming a vacuum seal between the polymer and the metal knife edge. One particular advantage of polymer molded vacuum components is that a housing having a flange and metal feedthrough pins disposed through the housing can be formed in a single manufacturing step, rather than separately manufacturing three distinct components that are subsequently joined together. Another particular advantage of using a polymer housing 110a-f is that a centering ring can be designed as an integral component of the flange. The centering ring can be molded directly into the flange portion 150 of the polymer housing 110a-f. A polymer housing can be formed having other flange types as well. As illustrated in FIGS. 16A-C, a housing can be formed having a standard flange (FIG. 16A), an insert molded centering ring (FIG. 16B), or a one piece flange and centering ring (FIG. 16C).

Figure 2:
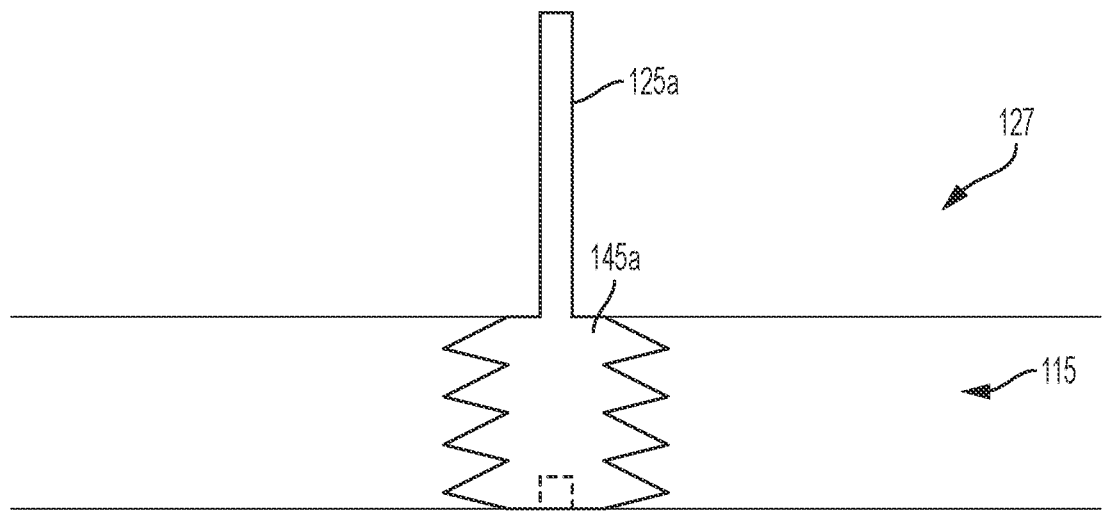
FIG. 2 is an illustration of an electrical feedthrough pin disposed through the housing of an ionization vacuum gauge. The electrical feedthrough pin has a threaded portion disposed within the polymer of the housing.
Figure 3:
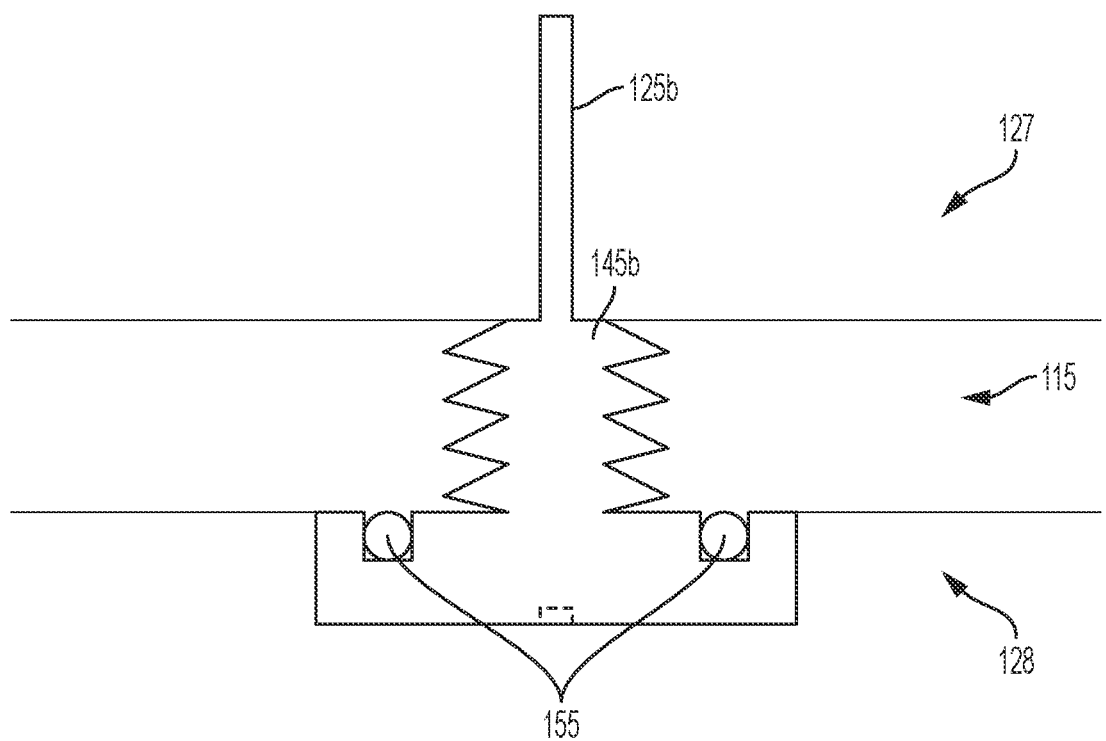
FIG. 3 is an illustration of an electrical feedthrough pin disposed through the housing of an ionization gauge. The electrical feedthrough pin is further coupled to the housing with an O-ring.
Figure 4:
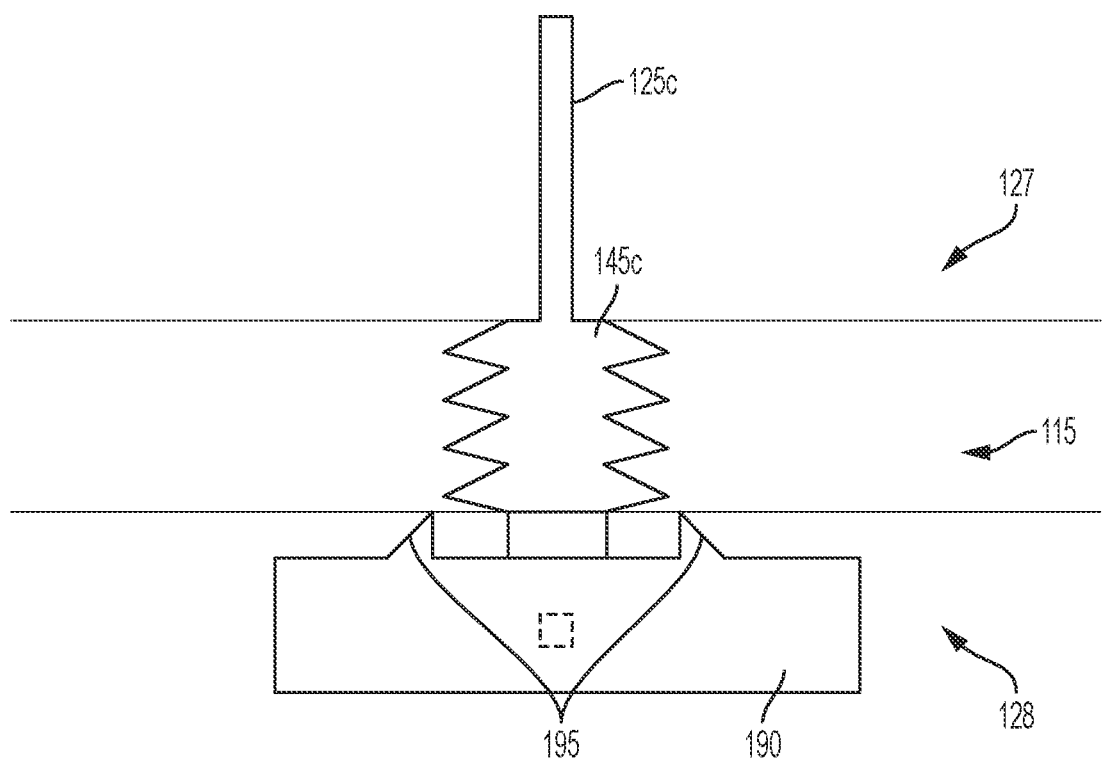
FIG. 4 is an illustration of an electrical feedthrough pin disposed through the housing of an ionization gauge. The electrical feedthrough pin is further coupled to the housing with a shape memory polymer having a knife edge.

The electrical feedthrough pins can have a number of unique geometries, particularly where the electrical feedthrough pin passes through the polymeric housing material. FIGS. 2-5 illustrate electrical feedthrough pins disposed through the housing of a gauge. The housing 115 having a vacuum side 127 and an exterior side 128 (sometimes referred to as the "air" side) is formed of a polymeric material. In FIGS. 2-4, the electrical feedthrough pin 125a-c has a threaded portion 145a-c disposed within the polymer of the housing 115. In FIG. 3, the electrical feedthrough pin 125b is further coupled to the housing with an O-ring 155. The threaded portion 145a-c increases the surface contact area between the electrical feedthrough pin 125a-c and polymer 115, thereby increasing the path length that an atom or molecule must traverse to diffuse from the high-pressure side (e.g., the exterior side) to the vacuum side (e.g., the interior side) of the electrical feedthrough pin 125a-c. The O-ring 155 further seals the interface between the electrical feedthrough pin 125b and the polymer material of the housing 115. In FIG. 4, the electrical feedthrough pin 125c is further coupled to the housing with a component 190 having a knife edge portion 195, which facilitates coupling to the housing 115. The component 190 can be formed of a shape memory polymer, such as a thermally-activated shape memory polymer.

Figure 5:
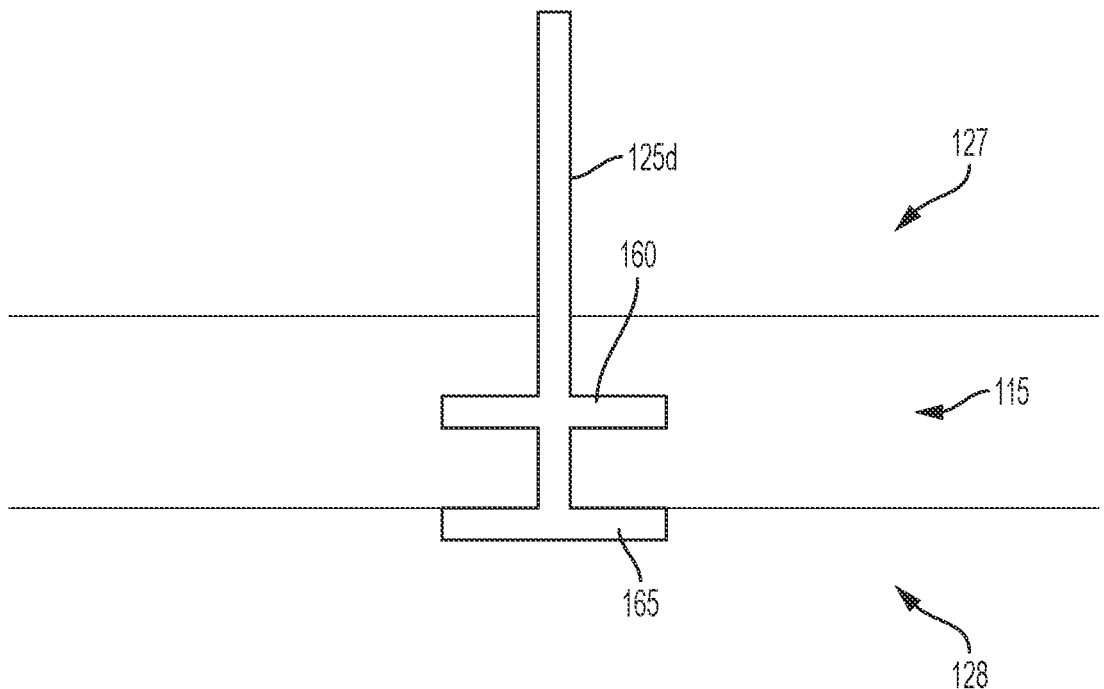
FIG. 5 is an illustration of an electrical feedthrough pin disposed through the housing of an ionization gauge. The electrical feedthrough pin has an extended disc portion disposed within the polymer of the housing.

The use of molding techniques enables the fabrication of other complex structures having long path lengths between the exterior (atmospheric) side and the interior (vacuum) side of the electrical feedthrough pin. FIG. 5 illustrates another electrical feedthrough pin 125d disposed through the housing 115 of an ionization gauge. The electrical feedthrough pin 125d has an extended disc portion 160 disposed within the polymer of the housing 115 and an extended disc portion 165 on the exterior side of the housing 115. Similar to the threaded feedthrough, the extended disc increases the surface contact area between the electrical feedthrough pin 125d and polymer 115, thereby increasing the path length that an atom or molecule must traverse to diffuse from the high-pressure side (e.g., the exterior side) to the vacuum side (e.g., the interior side) of the electrical feedthrough pin 125d. More complex structures, such as multiple discs or combinations of threaded portions and discs, can also be used.

Figure 6:
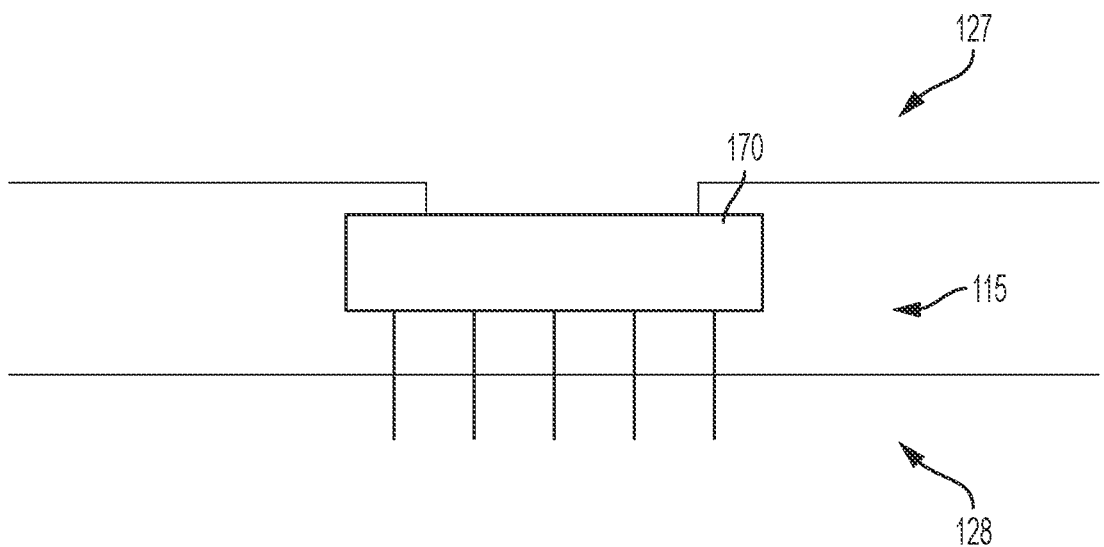
FIG. 6 is an illustration of a sensor disposed within the housing of an ionization gauge.

The techniques described herein can also be used on existing vacuum headers or assemblies. Vacuum sensors can be purchased from suppliers pre-packaged into standard vacuum compatible headers such as T05 and T08, which are inexpensive, common, readily available standard electrical headers. These sensors are often integrated into a larger vacuum gauging solution containing multiple sensors as required to provide enhanced pressure ranges. A method is needed to seal these headers into the larger vacuum gauge and the techniques described above can be used for this application as well. FIG. 6 is an illustration of a sensor 170 disposed within the housing of an ionization vacuum gauge.

The selection criteria for materials for the housing includes several different attributes: First, the material should produce minimal outgassing. This includes low outgassing of materials adsorbed on the internal surfaces exposed to vacuum as well as reduced outgassing of plasticizers from the bulk of the material. Polymers providing an outgassing rate less than $5 \times 10^{-6}$ Torr L s$^{-1}$ cm$^{-2}$ are preferred as they provide the ability to develop vacuum gauges capable of measuring pressures and/or operating at pressures as low as 1E-08 Torr with typical pumping systems. For comparison, outgassing rates for components of construction are listed in Table 1. Second, the material should have a low gas permeation rate from the air side/exterior side to the vacuum side. The permeation rate is regulated through a combination of wall thickness and polymer composition. Third, the material selected should be compatible with the manufacturing processes selected to design the gauge. Particularly important are thermal properties of materials and chemical compatibility: the plastic materials selected must be compatible with chemical compounds present in the vacuum processes measured by the gauge. Additionally, polymers that are not hygroscopic, or those having a lower hygroscopicity, are preferred. Suitable polymeric materials for the housing (110a-f; 1030) include thermoset plastics and thermoplastics.

TABLE 1

Outgassing rates

| Component | Outgassing rate (Torr L s$^{-1}$ cm$^{-2}$) |
| --- | --- |
| Stainless steel | $2.5 \times 10^{-9}$ |
| Polypropylene | $7.73 \times 10^{-7}$ |
| Polyether ether ketone (PEEK) | $2.44 \times 10^{-6}$ |
| High density polyethylene (HDPE) | $2.68 \times 10^{-6}$ |
| Polycarbonate (PC) | $3.04 \times 10^{-6}$ |

Particular polymer materials that are suitable include polyether ether ketone (PEEK), polyolefins (e.g., polypropylene), polymethyl methacrylate (PMMA), acrylonitrile butadiene styrene (ABS), fluoropolymers, polytetrafluoroethylene, polyethylene, NALGENE, VESPEL polyimide, polycarbonates, polystyrene, and KAPTON. Some polymers, such as PEEK, have shape memory properties, particularly when exposed to heat. These properties can be exploited to enhance the integrity of the components or make them more easily reusable.

One particularly suitable polymer is polyether ether ketone (PEEK), which is not hygroscopic and provides low oxygen and water permeation, low outgassing, and sufficiently high tensile strength and flexural modulus. Another suitable polymer is polycarbonate, which provides high dielectric strength (and, therefore, low leakage current between the electrodes), low outgassing, and is metal-coatable. Polyolefins, such as polypropylene, are also suitable. In particular, polypropylene is not hygroscopic and provides low water absorption, low outgassing, high dielectric strength, and quick pressure pump down. In operation, most of the flux into the vacuum system is due to water molecules, which tend to form monolayers on the steel surfaces. However, polypropylene and other polyolefins have a lower affinity to water compared to other polymers, thus reducing the quantity of water that may need to be pumped out of a vacuum system. In ultra-high vacuum systems, even a small quantity of water molecules can significantly impact the quality of the vacuum, and therefore reducing the affinity of the material to water adsorption can significantly reduce operating burdens on the user. Using polymers with low water affinity offers the opportunity to produce fast pump-downs as it is not necessary to remove layers of water from the walls to achieve ultimate vacuum. In summary, material selection for a gauge housing is a multivariable process that involves considering the affinity of the material to water, its permeability to atmospheric gases, and its ability to be formed to the desired shape using low cost manufacturing processes.

The housing can be fabricated by known polymer molding techniques. Typically, one or more electrical feedthrough pins are positioned in a mold. Molten polymer is flowed into the mold and allowed to solidify to form a housing. This construction technique allows for virtually any shape conductive material to be used, such as square, or diamond shape, to accommodate keying of connectors or otherwise allowing for a unique determination of conductor geometries. It also allows the conductor to follow a nonlinear path through the polymer from the atmospheric (air) side of the gauge to the vacuum side. These non-straight paths may be useful, for example, in spatially controlling the location of magnetic fields generated by the currents flowing in the wire, or allowing the feedthrough to route around shielding or other barriers to deliver the electrical signal where it is needed in the gauge.

Alternatively, press-fit electrical feedthrough pins or tubes can be placed into holes molded into the body of the housing after the polymer has solidified. Typically, the holes drilled in the plastic are slightly smaller than the electrical feedthrough pins that carry the signal. The electrical feedthrough pins can be press fit into the holes forming a tight seal between the polymer and the rods. Specifically, in one particular example, the holes can be 0.0425 inches and the electrical feedthrough pins can be made of stainless steel 0.0575 inches in diameter. One advantage of this approach is that the electrical feedthroughs do not need to be parallel to the axial direction of the gauge, as is common for most vacuum feedthroughs built using ceramics as the insulator. Other pertinent manufacturing techniques are injection molding, insert molding, blow molding, and three dimensional printing. In addition to pressing fitting feedthroughs, FIGS. 2-4 show that it is also possible to screw threaded feedthroughs into a housing. The threads provide a press fit to the housing, and a more torturous path for gas molecules to leak from the air side to the vacuum side of the housing.

In the embodiments described herein, the housing is made out of a single material. In some vacuum instruments, different portions of the housing or gauge may have different design requirements, such as requirements for thermal properties, conductivity, permeation or outgassing. In order to satisfy these different requirements, different polymers can be used to fabricate different sections of the housing or gauge. These portions can then be bonded together using traditional means, such as adhesives. Additionally, a metallic or other barrier coating protecting and/or limiting outgassing from the interface can be formed on one or more surfaces of the housing. If the materials are compatible, the bond can be formed by melting or otherwise causing one of materials to flow, and then joining a first portion of the housing to a second portion of the housing before it re-polymerizes or hardens. The electrical feedthrough pin can be made of many different types of conductive material, without needing to account for its high-temperature performance and coefficient of expansion compared to the ceramic or glass seals. Another advantage to this type of feedthrough is that it will accommodate virtually any type of conductive material, without needing to account for its high-temperature performance and coefficient of expansion compared to ceramic or glass seals. The conductive material, for example, can be a conductive carbon fiber, silver doped or silver impregnated elastomers, or other known conductors. Legacy feedthroughs generally require the use of brazing materials to bond metal to ceramics, and such brazing materials can be incompatible with customer applications. Brazing is typically not required for the polymeric gauges described herein.

Figure 9:
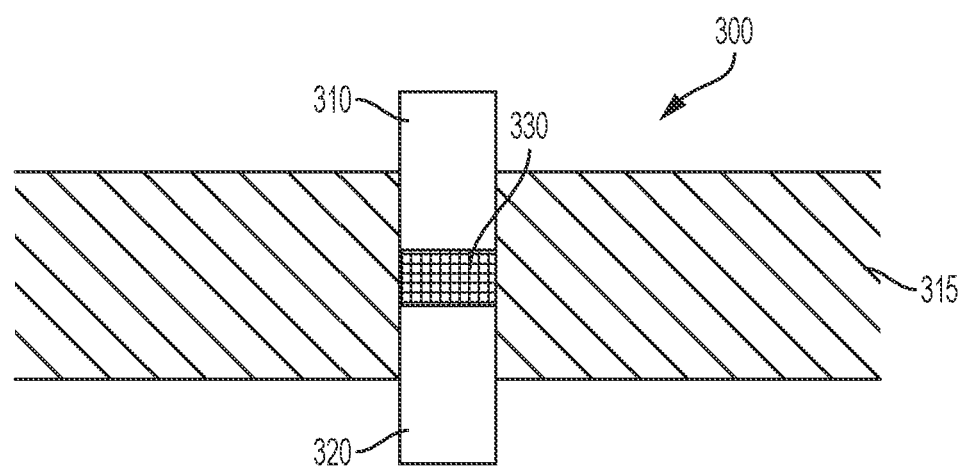
FIG. 9 is an illustration of an electrical feedthrough pin formed from two metal conductors and an embedded conductive material.

In order to eliminate the need for a metal to plastic seal, FIG. 9 illustrates an electrical feedthrough pin 300 constructed of two conductors 310 and 320 sandwiching a conductive polymer matrix 330. One of the conductors (e.g., 310) is positioned on the vacuum side (e.g., interior) of a sensor housing 315 and the other conductor (e.g., 320) is positioned on the atmospheric side (e.g., exterior) of a sensor housing 315. In this configuration, the conductive polymer matrix 330 can be molded directly into the sensor housing 315 in the case of thermoplastics or using insertion molding when this technique is not possible. The conductive polymer matrix 330 electrically couples the two conductors 310 and 320. Several suitable polymers are known in the industry including: poly(pyrrole)s (PPY), polyanilines (PANT), poly(thiophene)s (PT), poly(3,4-ethylenedioxythiophene) (PEDOT), poly(p-phenylene sulfide) (PPS), poly(acetylene)s (PAC) and poly(p-phenylene vinylene) (PPV).

Several techniques can be used to improve the vacuum seal of such a feedthrough. One approach is to add a vacuum compatible adhesive, such as TORR SEAL, VACSEAL, or LOCTITE, to the pin or in the drilled hole. The adhesive will increase the bond strength between the polymer and the electrical feedthrough pin resulting in an increase in both mechanical strength and the vacuum seal. A disadvantage of using adhesives is that many of them can outgas under vacuum unless some type of vapor barrier coating, as described above, is applied to the vacuum side of the electrical feedthrough pin. Electrical feedthrough pins, particularly those having a threaded portion, can be further sealed with an inert material, such as TEFLON tape.

Several other steps can be taken to increase both the vacuum performance of the seal and its mechanical strength. The application of heat can cause the plastic to soften and flow further increasing the contact surface between the conductor and polymer. Heat can be applied in several different ways. The polymer itself can be heated to soften the material allowing the hole to be further undersized in a press fit operation. Alternatively, the conductive material can be ohmically heated after the press fit to cause the plastic to flow increasing the integrity of the seal.

Figure 7:
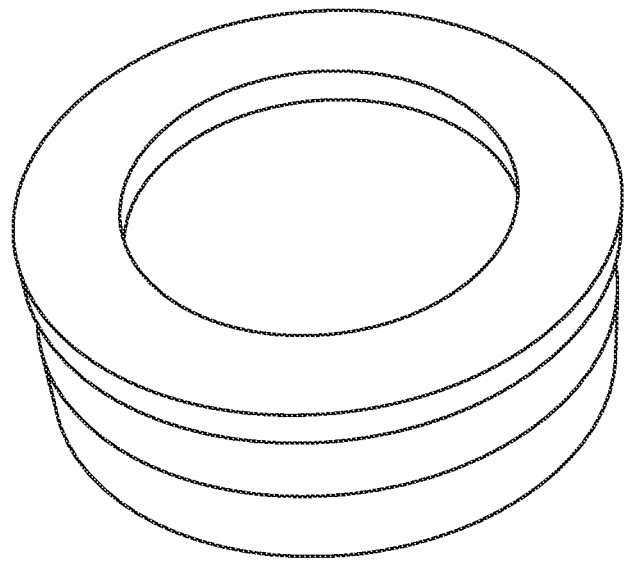
FIG. 7 is an illustration of a vacuum blank formed of a polymer.

In another embodiment, a component of a high vacuum housing is a molded polymer with a vacuum-sealing coating on the vacuum side of the housing. One particular embodiment is shown in FIG. 7, which is an illustration of an O-ring sealed (NW25KF) vacuum blank, which is a common vacuum type connection that uses an O-ring mounted on a metallic centering ring placed between smooth surfaces to form a face seal. A clamp is used to hold the O-ring and vacuum components together. An example vacuum blank has been formed from the polymer PEEK, and another example vacuum blank has been formed from the polymer acrylonitrile butadiene styrene (ABS). These blanks can be electroless plated with copper, and subsequently electroplated with nickel. Blanks are used to cover ports in the chamber that are currently not in use. Traditionally, ports are disks made of stainless steel or another metallic material that have a knife edge, groove, or other structure machined onto the chamber side that facilitates sealing to a gasket. These are generally smooth on the non-chamber side. By injection molding the structure of the blank, the blank can be produced in large volumes, at high rates and low cost, and the mechanical structure of the blank can be combined with the sealing structure of the flange. Electroplating the blank both creates the vapor barrier and encapsulates the sulfur in the electroless copper coating, which has a high vapor pressure. Other methods can be used to coat the components including, but not limited to, sputter deposition, sublimation, and chemical vapor deposition to name a few. Hydrophobic or oleophobic material may also be deposited to reduce pump down time without bakeout. Similarly, a chemically inactive material such as platinum could be deposited in a highly reactive environment to reduce the effect of the sensors on a critical process. Insulating coatings, such as $SiO_2$ and $Al_2O_3$, can also be used as well. Additionally, masking techniques can be used to selectively coat portions of the component in order to adjust its properties such as conductivity, outgassing, and surface smoothness so that it is optimized for a particular vacuum application. Thus, coatings can be used to provide the desired electrical or mechanical properties. Incidentally, experimentation with sample blanks as shown in FIG. 7 is an excellent way to test polymer materials and vapor barrier coatings against outgassing, permeation and mechanical properties.

Figure 8:
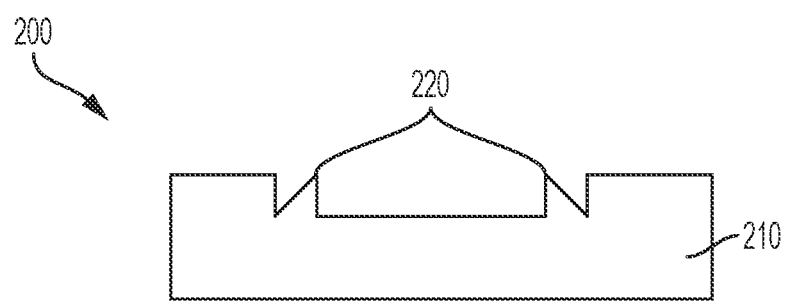
FIG. 8 is an illustration of a component of a high vacuum blank that has a knife edge.

Some vacuum seals, such as 2.75 inch ConFlat-type (NW35CF) and 1.33 inch ConFlat-type (NW16CF), incorporate a knife edge or other raised structure designed to penetrate a gasket enhancing the performance of the seal. In a polymer seal constructed of a material with shape memory properties, such an elevated structure could be designed such that when the seal is clamped to a vacuum system the knife edge or raised structure would be slightly crushed so that it conforms to any irregularities on the mating chamber side, increasing the integrity of the seal. When the component is taken off, and before re-use, heat can be applied to the raised structure causing it to return to its pre-deformation shape prior to making a second seal. The shape memory property can be exploited to assure the consistency of the seal when used multiple times. FIG. 8 is an illustration of a vacuum blank 200 having a body 210 formed of a polymer having shape memory properties. The vacuum blank 200 has a knife edge portion 220 for coupling to a gasket or other structure. Other components and seals of a high vacuum housing can also have a knife edge or other raised structure, as illustrated in FIG. 8.

The use of polymers to construct vacuum components also permits the construction of cathodes having different shapes, which may provide an advantage in some instruments. For example, a cathode shaped like a section of a cone would have a natural self centering property.

Figure 10:
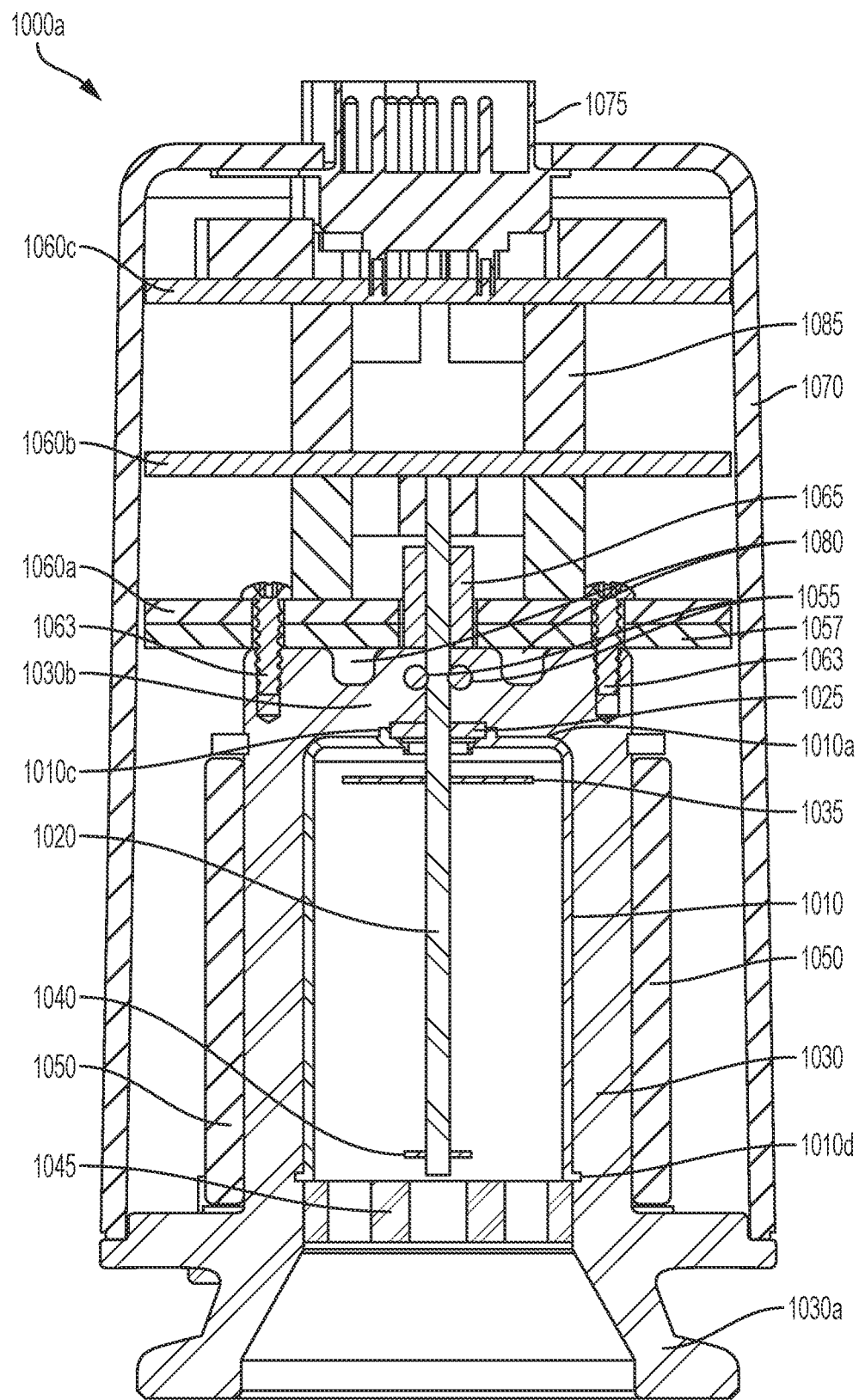
FIG. 10 is a cross-sectional view of one embodiment of a polymer composite cold cathode gauge.
Figure 11:
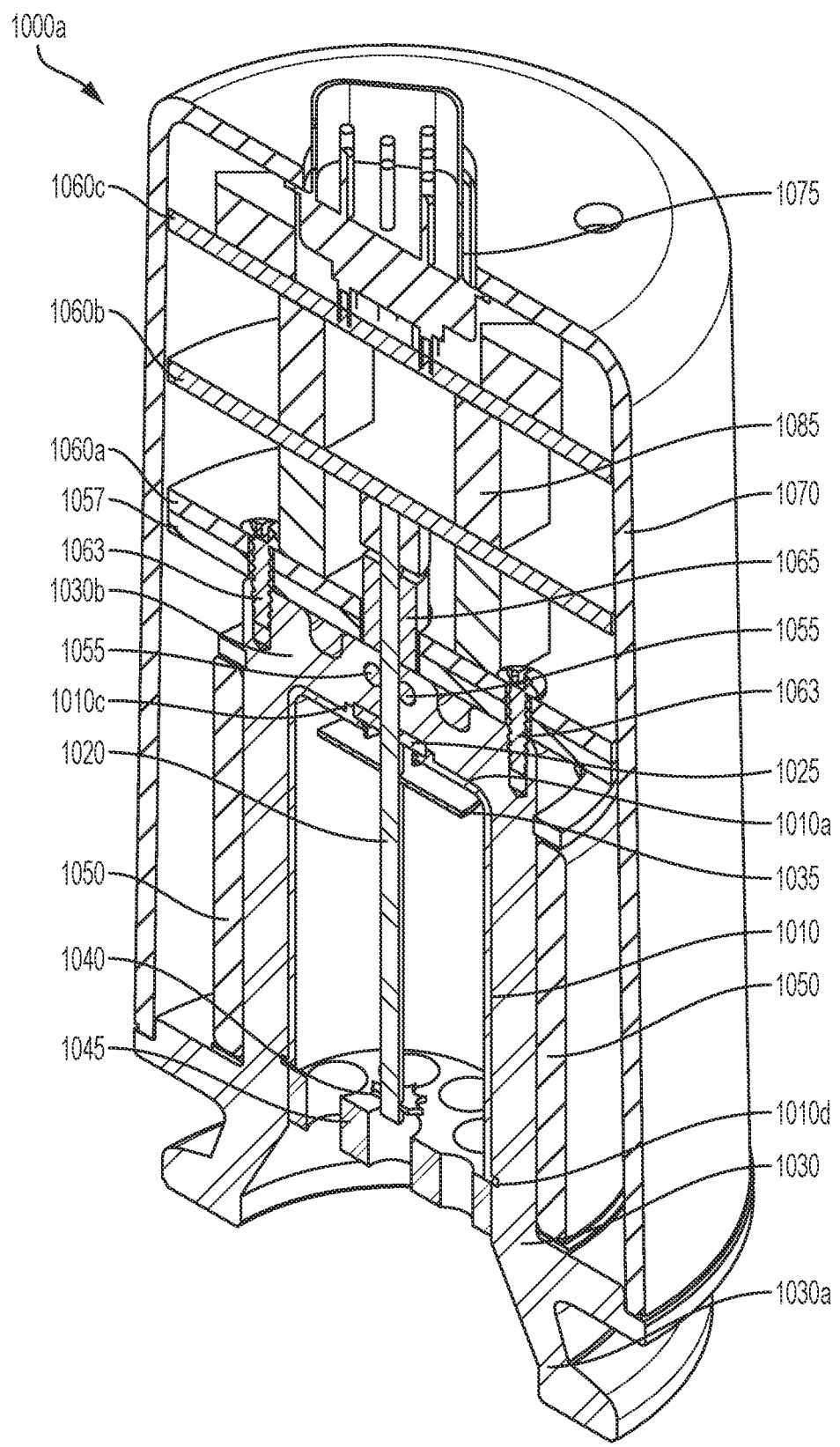
FIG. 11 is three-dimensional cross-sectional view of one embodiment of a polymer composite cold cathode gauge.
Figure 12:
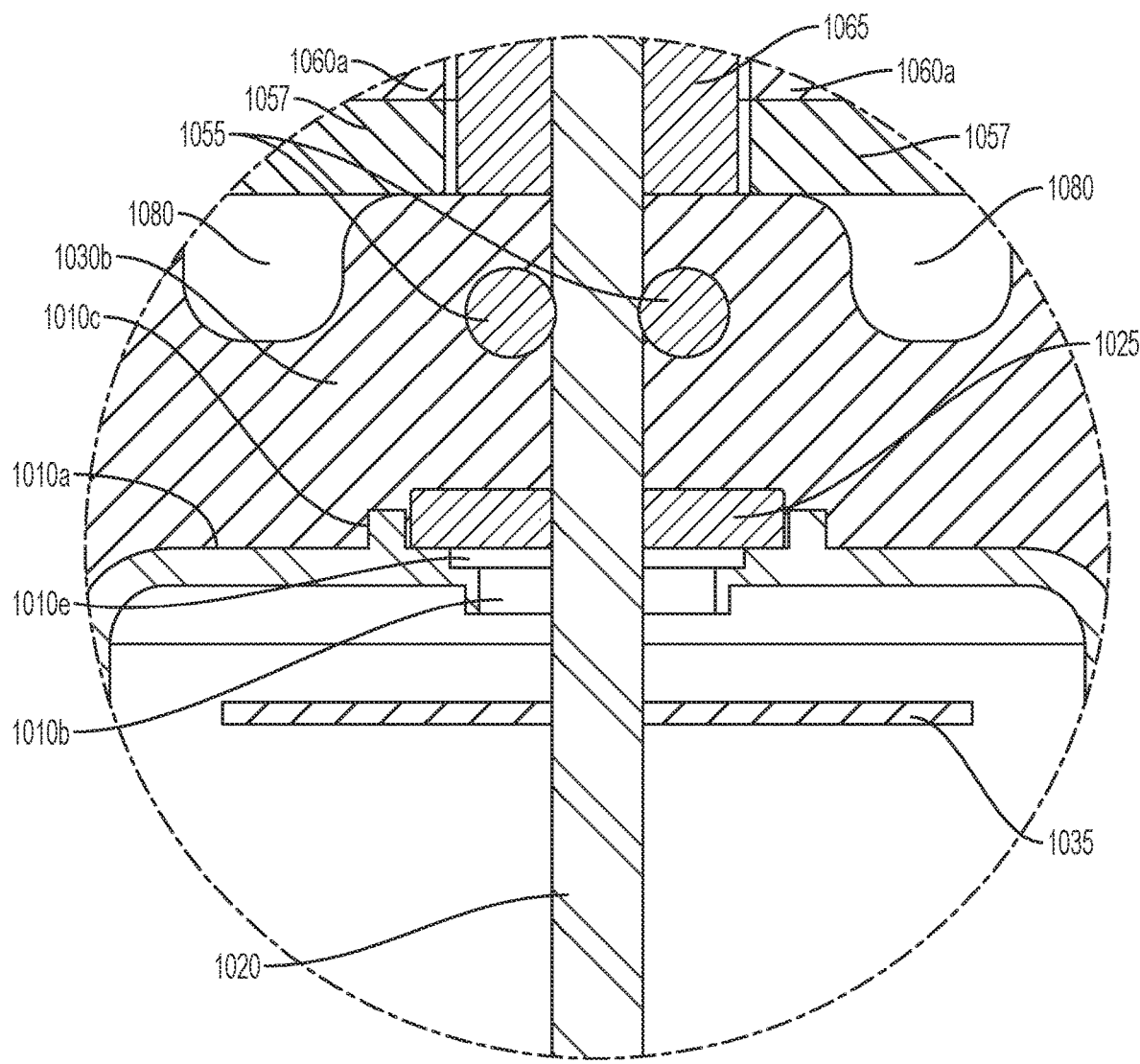
FIG. 12 is a magnified view of one embodiment of a polymer composite cold cathode gauge.
Figure 13:
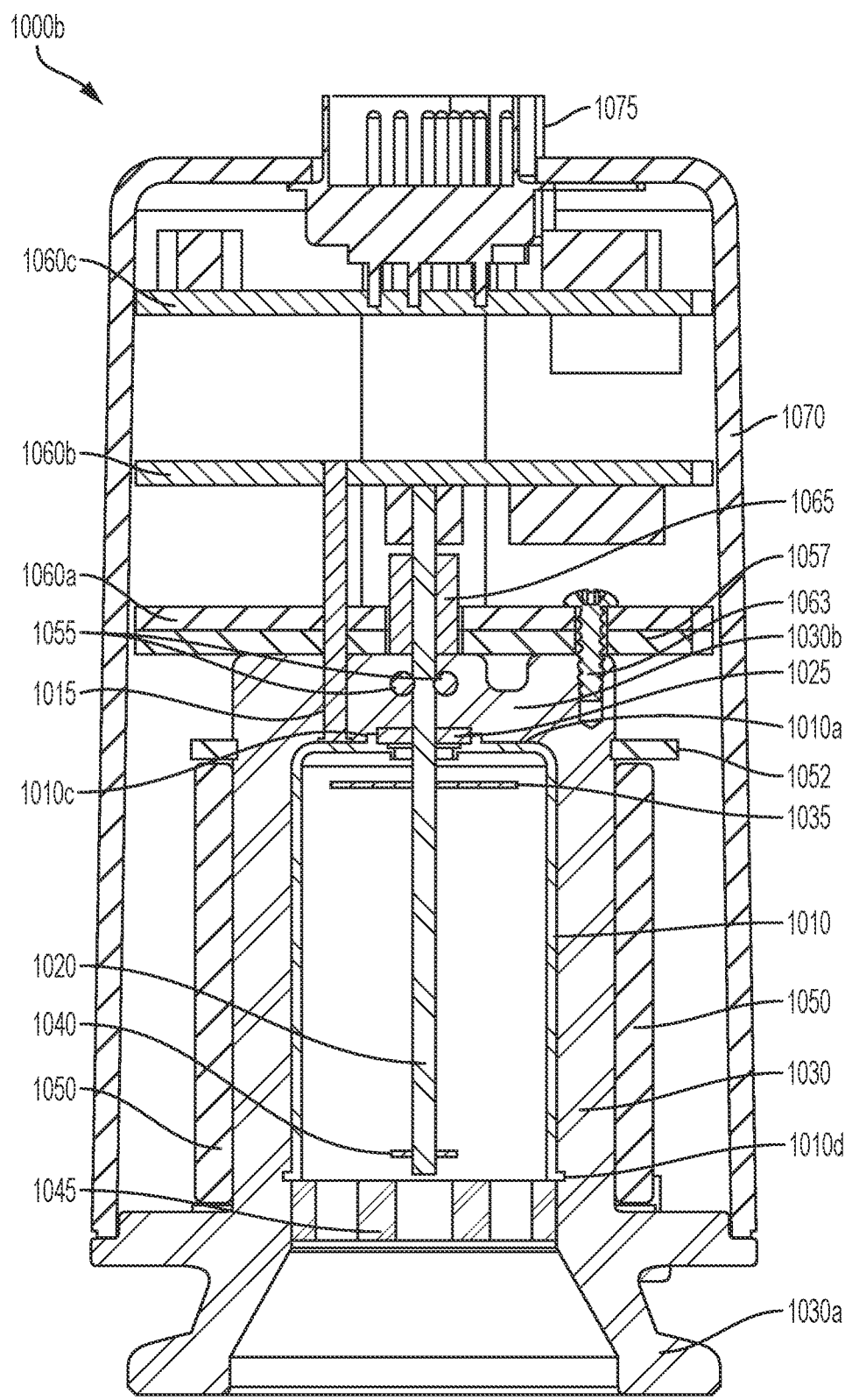
FIG. 13 is a cross-sectional view of another embodiment of a polymer composite cold cathode gauge.

One particular example of a polymer component is an ionization gauge, such as the cold cathode gauges 1000 illustrated in FIGS. 10-14. The ionization gauge has a cylindrical cathode cage 1010 having a base 1010*a*. The base 1010*a* can have an opening 1010*b*. A cathode pin 1015 can be electrically coupled to the cylindrical cathode cage 1010. An anode 1020 is disposed through the opening 1010*b* of the base 1010*a* of the cylindrical cathode cage 1010. An insulator 1025, shown in the shape of a disc in the embodiment of FIG. 10, is preferably formed of a ceramic, such as an alumina ceramic, and protects the interior of the polymer housing 1030 from plasma created during operation of a cold cathode cage. Typically, the insulator 1025 is located at the base 1010*a* of the cylindrical cathode cage 1010. Tests results have shown that including an insulator 1025 can result in significantly less deterioration of the polymer housing. A polymer housing 1030 surrounds the cylindrical cathode cage 1010. A sputter shield 1035 can be disposed within the cylindrical cathode cage 1010 in order to reduce sputtering contamination of the insulator 1025. The opening 1010*b* of the base 1010*a* of the cold cathode cage 1010 can have a step edge 1010*e* to shadow the insulator 1025 to minimize contamination at the interface between cathode 1010 and insulator 1025. A starter 1040 can be electrically coupled to the anode 1020, disposed within the cylindrical cathode cage 1010, and coaxial with the anode 1020. The starter 1040 can be press fit onto to the anode 1020, or it can be integrally formed with the anode 1020. The use of such a starter location is preferred in extended range gauges where fast turn-on times are required at the transition pressure from a Pirani gauge to a cold cathode gauge. Under such circumstances, the start is accelerated as a corona discharge is established between the anode and the screen 1045 or cathode cage 1010.

A bottom face of the base 1010*a* of the cylindrical cathode cage 1010 can have a lip 1010*c* surrounding and centering the insulator 1025, and the lip 1010*c* and insulator 1025 can be epoxied to each other to prevent a "virtual leak." An upper portion of the cold cathode cage 1010 can have a lip 1010*d* that extends radially outward from the cold cathode cage 1010 into the polymer housing 1030, which can help to lock the cylindrical cathode cage 1010 axially into the polymer housing 1030 and reduce the flux due to a "virtual leak" caused by air trapped in a thin volume surrounding the cathode that is not readily accessible. A screen 1045, which may be ferromagnetic, can be coupled to an upper portion of the cold cathode cage 1010.

Figure 14:
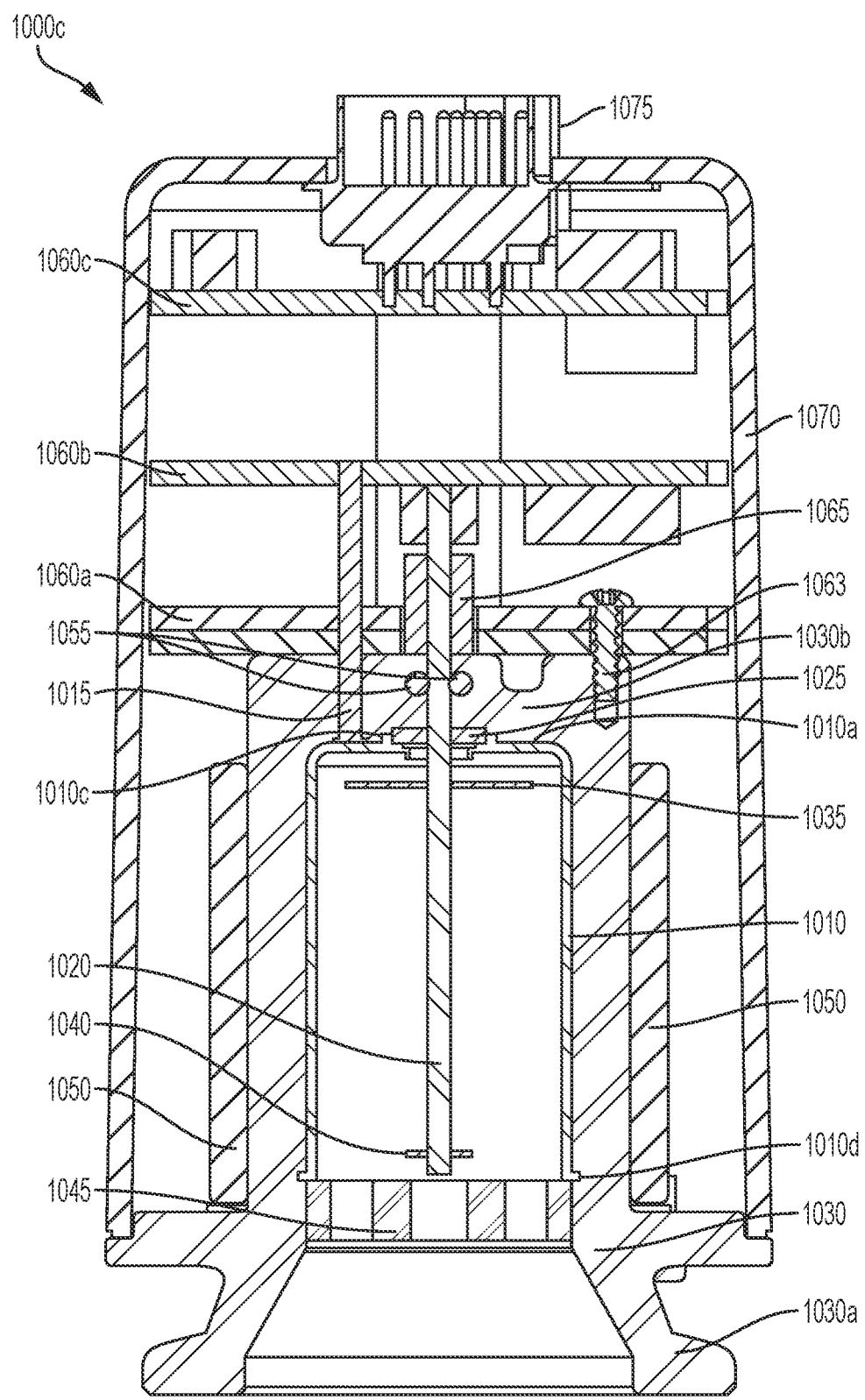
FIG. 14 is a cross-sectional view of an embodiment of a polymer composite cold cathode gauge having a magnet insert molded into the sensor.

The polymer housing 1030 can have a flange portion 1030*a*, which can be used to couple the ionization gauge to a chamber. A cylindrical magnet 1050 surrounds at least a portion of the polymer housing 1030. An optional snap ring 1052 (FIG. 13) can be disposed adjacent to an end of the magnet 1050 to support the magnet and hold it tightly in place both radially and axially. FIG. 14 illustrates an embodiment having a magnet that is insert molded into the polymer. Thus, the embodiment of FIG. 14 does not have a snap ring as the magnet is placed in the mold with the cathode cage, anode, insulator, and cathode pin. The magnet can be charged after the full assembly is completed.

An O-ring 1055 disposed around the anode 1020, and above the base 1010a of the cylindrical cathode cage 1010, can be embedded within the polymer housing to further aid in providing a vacuum seal. A cylindrical insulator 1065 can surround a portion of the anode 1020 disposed through the PCB 1060a. An enclosure 1070 can at least partially surround the polymer housing 1030 and PCBs 1060a-c. Printed circuit board 1060a is disposed adjacent to an optional insulator 1057. In some instances, the enclosure 1070 is formed of a polymer. In some embodiments, a connector 1075 can be coupled to the enclosure 1070. Polymer material has been removed 1080, for example by coring out, at the base of the polymer housing 1030b. The coring 1080 provides a more uniform wall thickness to eliminate sink and poor cosmetics.

In some embodiments, one or more printed circuit boards (PCB) 1060a-c can be included. The anode 1020 is disposed through a first PCB 1060a, and the polymer housing 1030 is mechanically coupled to the PCB 1060a, typically by one or more fastening devices 1063 (e.g., screws). The PCBs 1060a-c can be joined by a PCB connector 1085.

A variety of flange configurations can be created for connecting a gauge to a process chamber. FIG. 16A illustrates a standard flange. FIG. 16B illustrates a flange having an insert molded centering ring 1031. In this embodiment, the centering ring is metallic and overmolded into the polymer housing. An O-ring can be added to couple to the housing to a process chamber. FIG. 16C is a one piece flange and centering ring 1032. In this embodiment the centering ring is polymer and molded as a homogenous part of the polymer housing.

Figure 17A:
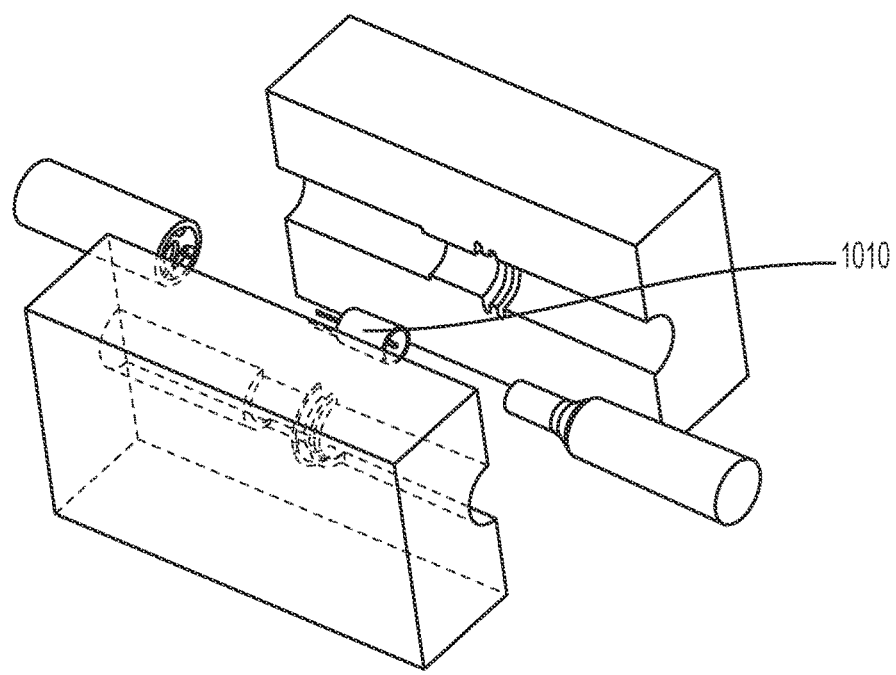
FIGS. 17A and 17B are illustrations of an injection molding process.
Figure 17B:
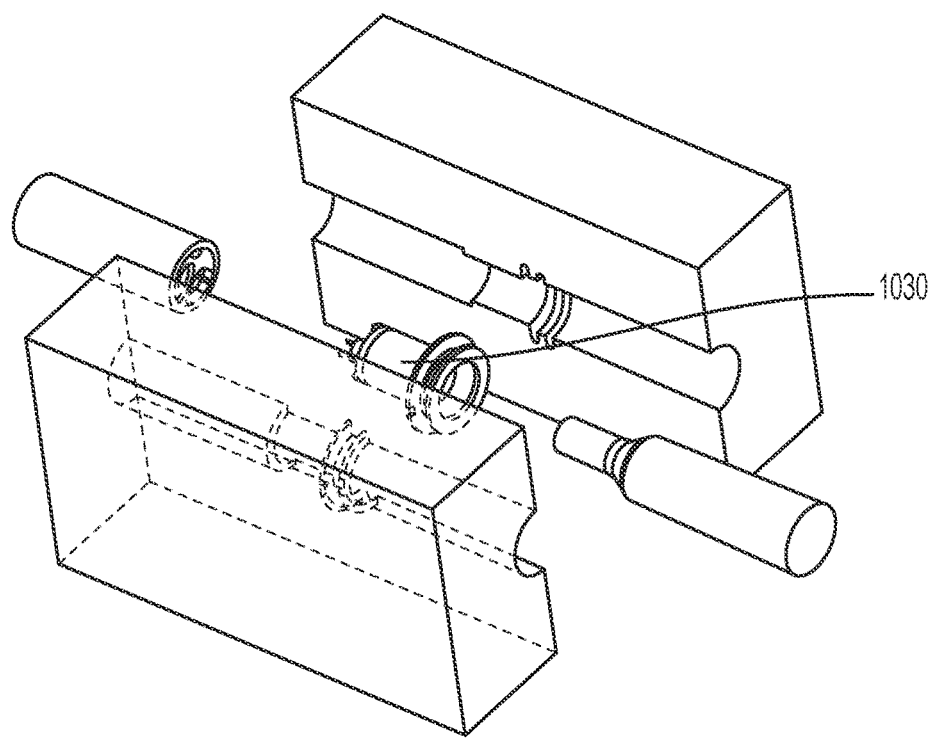

A housing for use in an ionization gauge can be made by positioning an ionization gauge assembly within a mold, as illustrated in FIGS. 17A and 17B. The ionization gauge assembly can include a cylindrical cathode cage 1010 having a base 1010a and an opening 1010b therein, a cathode pin 1015 electrically coupled to the cathode, an anode 1020 disposed through the opening 1010b of the base 1010a of the cylindrical cathode cage 1010, and an insulator 1025 at the base 1010a of the cylindrical cathode cage 1010 configured to protect a polymer housing at an interface between the cylindrical cathode cage 1010 and the polymer housing. Molten polymer is then flowed into the mold and allowed to solidify to form a housing 1030 around the cylindrical cathode cage, cathode pin, anode, and insulator. A cylindrical magnet 1050 can be positioned so that it surrounds at least a portion of the polymer housing 1030. An O-ring 1055 can be positioned around the anode 1020, within the polymer housing 1030, and above (as viewed in FIGS. 11-14) the base 1010a of the cylindrical cathode cage 1010. One or more PCBs 1060a-c can be mechanically coupled to the polymer housing 1030, and the anode 1020 can be disposed through one or more of the PCBs 1060a-c. An enclosure 1070 can be positioned so that it surrounds the polymer housing 1030 and the one or more PCBs 1060a-c. A connector 1075 can be coupled to the enclosure 1070.

In essence, this process allows preassembly of the gauge sensor components and then uses plastic injection molding to encapsulate the sensor elements into a housing in a single step, including vacuum sealing feedthroughs to the housing and providing an integrated mounting flange. The same methodology is applicable to other kinds of vacuum gauges, including ionization, thermal conductivity, and membrane deflection gauges. Using polymeric materials to develop and manufacture the building blocks of vacuum gauges also allows production of lower cost gauges in which a combination of sensor technologies is combined to provide an expanded measurement range. During operation, vacuum systems can experience very wide pressure swings, and often multiple gauges are used to be able to provide measurements over the entire range of operation. Even though some of the gauges may not be used to measure the lowest vacuum levels, all of them need to compatible with operation at high vacuum levels. The plastic material selections should take into account not only the pressure measurement range of the gauge, but also the minimum pressure range to which the gauge will be exposed.

Figure 15:
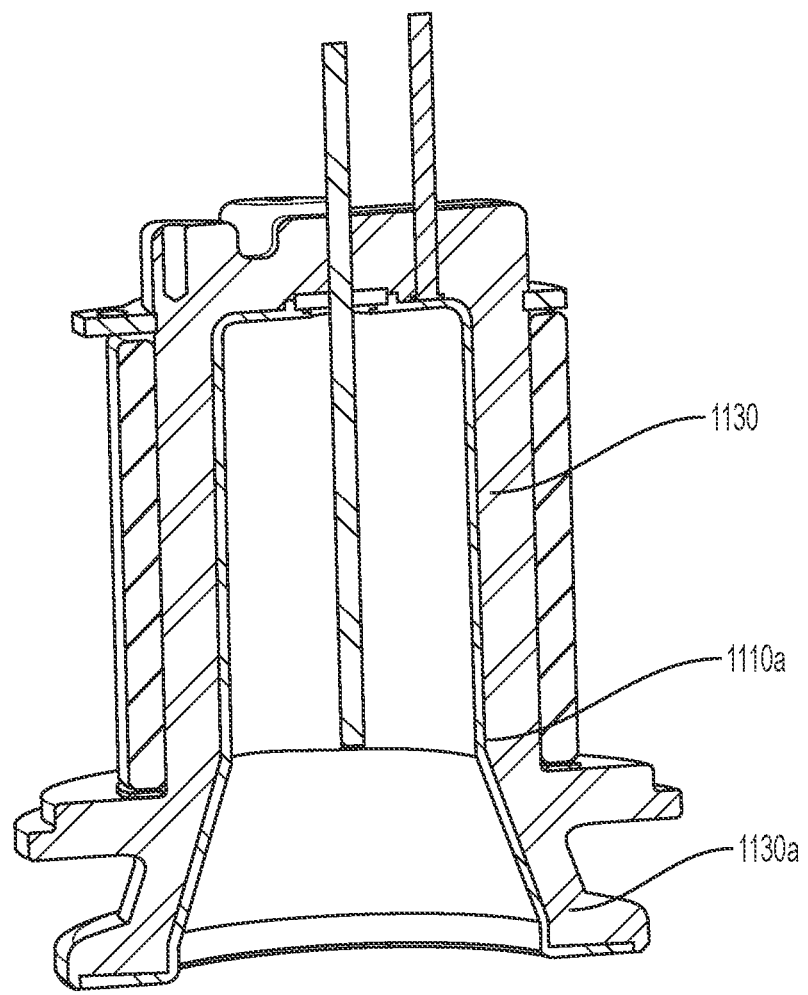
FIG. 15 is a cross-sectional view of yet another embodiment of a polymer composite cold cathode gauge having an extended cathode cage.

Another embodiment, which has an extended cold cathode cage, is illustrated in FIG. 15. Cathode cage 1110a is extended downwardly towards flange portion 1130a of polymer housing 1130. One benefit of this arrangement is that the metal cathode lines a greater portion of the interior surface, preferably the entirety of the interior surface, of polymer housing 1130, which can reduce permeation of air and outgassing from the polymer into a vacuum chamber.

The embodiments described herein incorporate a number of the features, or building blocks, for the design of gauges and sensors. Combining those building blocks into a single embodiment can create a particularly successful gauge. For example, a gauge that includes a properly selected polymer material (e.g., not hygroscopic, provides low outgassing, high tensile strength and flexural modulus, and high dielectric strength) preserves the quality of the vacuum. Further inclusion of an electrical feedthrough pin having a tortuous, or non-linear, path provides for a longer path length for gas molecules to traverse, thereby reducing gas flux from an air side to a vacuum side, which further improves the quality of the vacuum seal. Improving the quality of the vacuum seal can, in turn, improve the sensitivity and accuracy of the resulting gauge measurements.

Typically, ionization gauges includes numerous other components, such as those described in U.S. Patent Publication No. 2015/0091579, PCT Publication No. WO/2015/048664, and U.S. Pat. No. 7,847,559, the entirety of all of which are incorporated herein by reference. This application also incorporates herein by reference the entirety of U.S. Provisional Patent Application No. 62/103,968, filed on Jan. 15, 2015.

While this invention has been particularly shown and described with references to example embodiments thereof, it will be understood by those skilled in the art that various changes in form and details may be made therein without departing from the scope of the invention encompassed by the appended claims.

What is claimed is:
1. A method of making a gauge, the method comprising:
 a) positioning a gauge assembly within a mold, the gauge assembly comprising an electrical feedthrough pin disposed through an opening of a base;
 b) flowing molten polymer into the mold; and
 c) allowing the molten polymer to solidify to form a polymer vacuum housing around the electrical feedthrough pin such that the electrical feedthrough pin is disposed directly through the polymer vacuum housing.
2. The method of claim 1, further comprising another electrical feedthrough pin that is disposed through a side of the polymer vacuum housing.

3. The method of claim 1, wherein the electrical feedthrough pin has a nonlinear portion.

4. The method of claim 3, wherein the nonlinear portion is disposed through the polymer vacuum housing.

5. The method of claim 1, wherein the electrical feedthrough pin has a threaded portion disposed through the polymer vacuum housing.

6. The method of claim 1, wherein the electrical feedthrough pin is further coupled to the polymer vacuum housing with an O-ring.

7. The method of claim 1, wherein the electrical feedthrough pin has an extended disc portion disposed within the polymer vacuum housing.

8. The method of claim 1, wherein the mold forms a flange to couple the gauge to a process chamber.

9. The method of claim 1, wherein:
the electrical feedthrough pin is an anode disposed through the opening of the base; and
the gauge assembly further comprises a cathode feedthrough pin that is electrically coupled to a cylindrical cathode cage, wherein the cylindrical cathode cage comprises the base.

10. The method of claim 9, wherein the gauge assembly further comprises a sputter shield disposed within the cylindrical cathode cage that is coaxial with the anode.

11. The method of claim 9, wherein the gauge assembly further comprises a starter that is electrically coupled to the anode and disposed within the cylindrical cathode cage.

12. The method of claim 9, wherein an upper portion of the cylindrical cathode cage has a lip that extends radially outward from the cylindrical cathode cage into the polymer housing.

13. The method of claim 9, wherein the gauge assembly further comprises a ferromagnetic screen coupled to an upper portion of the cylindrical cathode cage.

14. The method of claim 9, further comprising positioning an O-ring around the anode, within the polymer housing, and below the base of the cylindrical cathode cage.

15. The method of claim 9, further comprising mechanically coupling a printed circuit board to the polymer housing, wherein the anode is disposed through the printed circuit board.

16. The method of claim 9, wherein the polymer housing is formed of polyether ether ketone (PEEK), polypropylene, or polycarbonate.

17. The method of claim 9, wherein the polymer housing is formed of a polymer having an outgassing rate less than $5\times10^{-6}$ Torr L $s^{-1}$ $cm^{-2}$.

18. The method of claim 9, wherein the polymer housing is formed of a polymer that is not hygroscopic.

19. The method of claim 9, further comprising positioning a cylindrical insulator that surrounds a portion of the anode disposed through the printed circuit board.

20. The method of claim 9, further comprising positioning an enclosure that at least partially surrounds the polymer housing and printed circuit board.

21. The method of claim 20, wherein the enclosure is formed of a polymer.

22. The method of claim 20, further comprising coupling a connector to the enclosure.

* * * * *